US012683407B2

(12) United States Patent (10) Patent No.: US 12,683,407 B2
Noguchi (45) Date of Patent: Jul. 14, 2026

(54) ELECTRICAL POWER SUPPLY SYSTEM, MOVING OBJECT, AND METHOD OF CONTROLLING ELECTRICAL POWER SUPPLY SYSTEM

(71) Applicant: HONDA MOTOR CO., LTD., Tokyo (JP)

(72) Inventor: Kenji Noguchi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 20 days.

(21) Appl. No.: 19/037,692

(22) Filed: Jan. 27, 2025

(65) Prior Publication Data

US 2025/0246915 A1 Jul. 31, 2025

(30) Foreign Application Priority Data

Jan. 30, 2024 (JP) ................................ 2024-011435

(51) Int. Cl.
*H02J 3/00* (2026.01)
*B64D 31/16* (2024.01)
(Continued)

(52) U.S. Cl.
CPC ................ *H02J 3/46* (2013.01); *B64D 31/16* (2024.01); *H02H 3/003* (2013.01); *H02J 3/007* (2020.01);
(Continued)

(58) Field of Classification Search
CPC ...... H02J 3/46; H02J 3/007; H02J 3/28; H02J 2105/32; H02J 1/084; H02J 1/102;
(Continued)

(56) References Cited

U.S. PATENT DOCUMENTS

2011/0273012 A1* 11/2011 Tardy ........................ H02J 4/00
307/9.1
2022/0204173 A1* 6/2022 Barraco ................ B64D 47/00
2023/0399099 A1* 12/2023 Dinel ...................... H02J 1/086

FOREIGN PATENT DOCUMENTS

EP 3 772 791 A1 2/2021
JP 2022-529997 A 6/2022

OTHER PUBLICATIONS

Extended European Search Report dated Jun. 10, 2025 issued in corresponding European application No. 25154313.8 (9 pages).

* cited by examiner

*Primary Examiner* — Shardul D Patel
(74) *Attorney, Agent, or Firm* — Rankin, Hill & Clark LLP

(57) ABSTRACT

An electrical power supply system is equipped with a first electrical power supply circuit that supplies an electrical power output from a first electrical power conversion device to a first load device, a second electrical power supply circuit that supplies an electrical power output from a second electrical power conversion device to a second load device, and a first connection circuit that is capable of connecting the first electrical power supply circuit and the second electrical power supply circuit, wherein, in the case of supplying the electrical power output from the second electrical power conversion device to the first load device, the electrical power output from the second electrical power conversion device is caused to be reduced, and thereafter, the first electrical power supply circuit and the second electrical power supply circuit are connected.

9 Claims, 27 Drawing Sheets

(51) Int. Cl.

| | |
|---|---|
| *H02H 3/00* | (2006.01) |
| *H02J 3/007* | (2026.01) |
| *H02J 3/28* | (2006.01) |
| *H02J 3/46* | (2006.01) |
| *H02M 7/217* | (2006.01) |
| *B64C 29/00* | (2006.01) |
| *H02J 105/30* | (2026.01) |

(52) U.S. Cl.
CPC ............... *H02J 3/28* (2013.01); *H02M 7/217* (2013.01); *B64C 29/0016* (2013.01); *H02J 2105/32* (2026.01)

(58) Field of Classification Search
CPC ... H02J 7/34; H02J 7/1423; H02J 3/00; B64D 31/16; H02H 3/003; H02M 7/217; B64C 29/0016
USPC ......................................................... 701/22
See application file for complete search history.

FIG. 4

ELECTRICAL POWER SUPPLY SYSTEM, MOVING OBJECT, AND METHOD OF CONTROLLING ELECTRICAL POWER SUPPLY SYSTEM

CROSS-REFERENCE TO RELATED APPLICATIONS

This application is based upon and claims the benefit of priority from Japanese Patent Application No. 2024-011435 filed on Jan. 30, 2024, the contents of which are incorporated herein by reference.

BACKGROUND OF THE INVENTION

Field of the Invention

The present invention relates to an electrical power supply system, a moving object, and a method of controlling an electrical power supply system.

Description of the Related Art

In recent years, in order to ensure that more people can have access to affordable, reliable, sustainable, and advanced energy, research and development is being carried out in relation to electrification technologies that contribute to energy efficiency.

In JP 2022-529997 A, an aircraft electrical energy supply network (electrical power supply system) is disclosed.

SUMMARY OF THE INVENTION

Incidentally, in techniques related to electrification technologies, there is a demand for a more satisfactory electrical power supply system, a moving object including a more satisfactory electrical power supply system, and a method of more satisfactorily controlling such an electrical power supply system.

The present invention has the object of solving the aforementioned problem.

A first aspect of the present disclosure is characterized by an electrical power supply system, comprising a first electrical power generating device configured to output a three-phase alternating current electrical power, a second electrical power generating device configured to output a three-phase alternating current electrical power, a first electrical power conversion device including a smoothing capacitor, and configured to convert the three-phase alternating current electrical power output from the first electrical power generating device into a direct current electrical power, a second electrical power conversion device including a smoothing capacitor, and configured to convert the three-phase alternating current electrical power output from the second electrical power generating device into a direct current electrical power, a first electrical power supply circuit configured to supply the direct current electrical power output from the first electrical power conversion device to a first load device, a second electrical power supply circuit configured to supply the direct current electrical power output from the second electrical power conversion device to a second load device, a first electrical power storage device configured to be connected to the first electrical power supply circuit in parallel with the first electrical power generating device, a second electrical power storage device configured to be connected to the second electrical power supply circuit in parallel with the second electrical power generating device, a first connection circuit equipped with a first connection device configured to connect the first electrical power supply circuit and the second electrical power supply circuit, and a control device configured to execute, on the first connection device, a first connection control that causes the first electrical power supply circuit and the second electrical power supply circuit to be connected, wherein in a case of supplying the direct current electrical power output from the second electrical power conversion device to the first load device, a first electrical power reduction control that causes the direct current electrical power output from the second electrical power conversion device to be reduced is executed on the second electrical power conversion device, and thereafter, the control device executes the first connection control on the first connection device.

A second aspect of the present disclosure is characterized by a moving object comprising the electrical power supply system according to the first aspect.

A third aspect of the present disclosure is characterized by a method of controlling an electrical power supply system, the electrical power supply system including a first electrical power generating device configured to output a three-phase alternating current electrical power, a second electrical power generating device configured to output a three-phase alternating current electrical power, a first electrical power conversion device including a smoothing capacitor, and configured to convert the three-phase alternating current electrical power output from the first electrical power generating device into a direct current electrical power, a second electrical power conversion device including a smoothing capacitor, and configured to convert the three-phase alternating current electrical power output from the second electrical power generating device into a direct current electrical power, a first electrical power supply circuit configured to supply the direct current electrical power output from the first electrical power conversion device to a first load device, a second electrical power supply circuit configured to supply the direct current electrical power output from the second electrical power conversion device to a second load device, a first electrical power storage device configured to be connected to the first electrical power supply circuit in parallel with the first electrical power generating device, a second electrical power storage device configured to be connected to the second electrical power supply circuit in parallel with the second electrical power generating device, and a first connection circuit equipped with a first connection device configured to connect the first electrical power supply circuit and the second electrical power supply circuit, the method comprising, in a case of supplying the direct current electrical power output from the second electrical power conversion device to the first load device, executing, on the second electrical power conversion device, a first electrical power reduction control that causes the direct current electrical power output from the second electrical power conversion device to be reduced, and thereafter executing, on the first connection device, a first connection control that causes the first electrical power supply circuit and the second electrical power supply circuit to be connected.

According to the present invention, it is possible to provide a more satisfactory electrical power supply system, a moving object including a more satisfactory electrical power supply system, and a method of more satisfactorily controlling such an electrical power supply system. In addition, this in turn also contributes to energy efficiency.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 4 is a schematic diagram showing the configuration of the reverse flow prevention device in the first embodiment;

DETAILED DESCRIPTION OF THE INVENTION

First Embodiment

Configuration of Electrical Power Supply System

Figure 1:
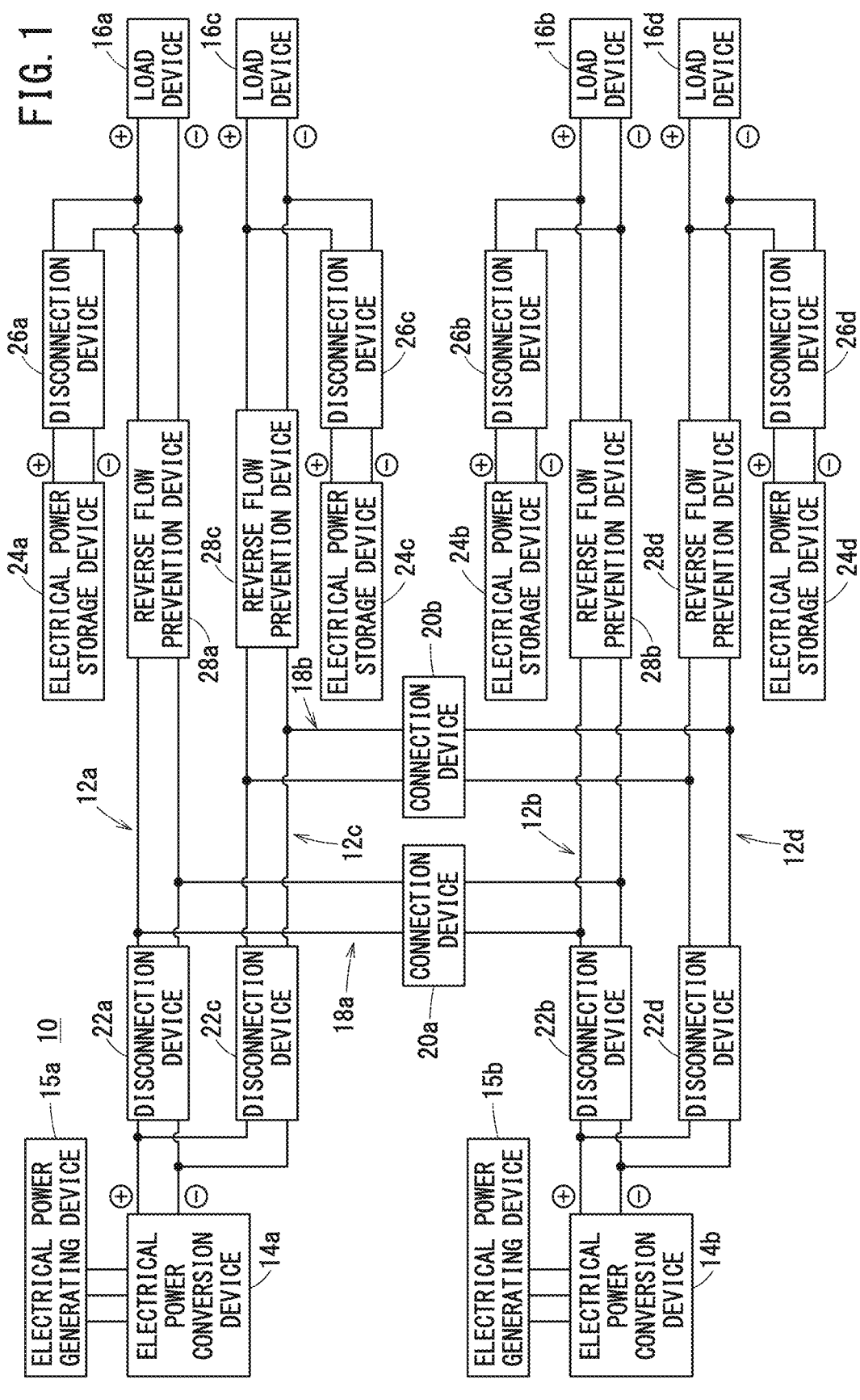
FIG. 1 is a schematic diagram of an electrical power supply system according to a first embodiment.

An electrical power supply system 10 according to the present embodiment will be described with reference to the drawings. FIG. 1 is a schematic diagram of the electrical power supply system 10 according to the present embodiment.

The electrical power supply system 10 includes a first electrical power supply circuit 12a, a second electrical power supply circuit 12b, a third electrical power supply circuit 12c, and a fourth electrical power supply circuit 12d.

The first electrical power supply circuit 12a supplies a DC electrical power output from a first electrical power conversion device 14a to a first load device 16a. The second electrical power supply circuit 12b supplies a DC electrical power output from a second electrical power conversion device 14b to a second load device 16b. The third electrical power supply circuit 12c supplies a DC electrical power output from the first electrical power conversion device 14a to a third load device 16c. The fourth electrical power supply circuit 12d supplies a DC electrical power output from the second electrical power conversion device 14b to a fourth load device 16d.

The first electrical power conversion device 14a converts the three-phase AC electrical power output from a first electrical power generating device 15a into a DC electrical power. The second electrical power conversion device 14b converts the three-phase AC electrical power output from a second electrical power generating device 15b into a DC electrical power.

The first electrical power generating device 15a and the second electrical power generating device 15b each include an engine and an electrical power generator, neither of which is shown. The electrical power generator is driven by the engine, and thereby generates a three-phase AC electrical power.

Figure 2:
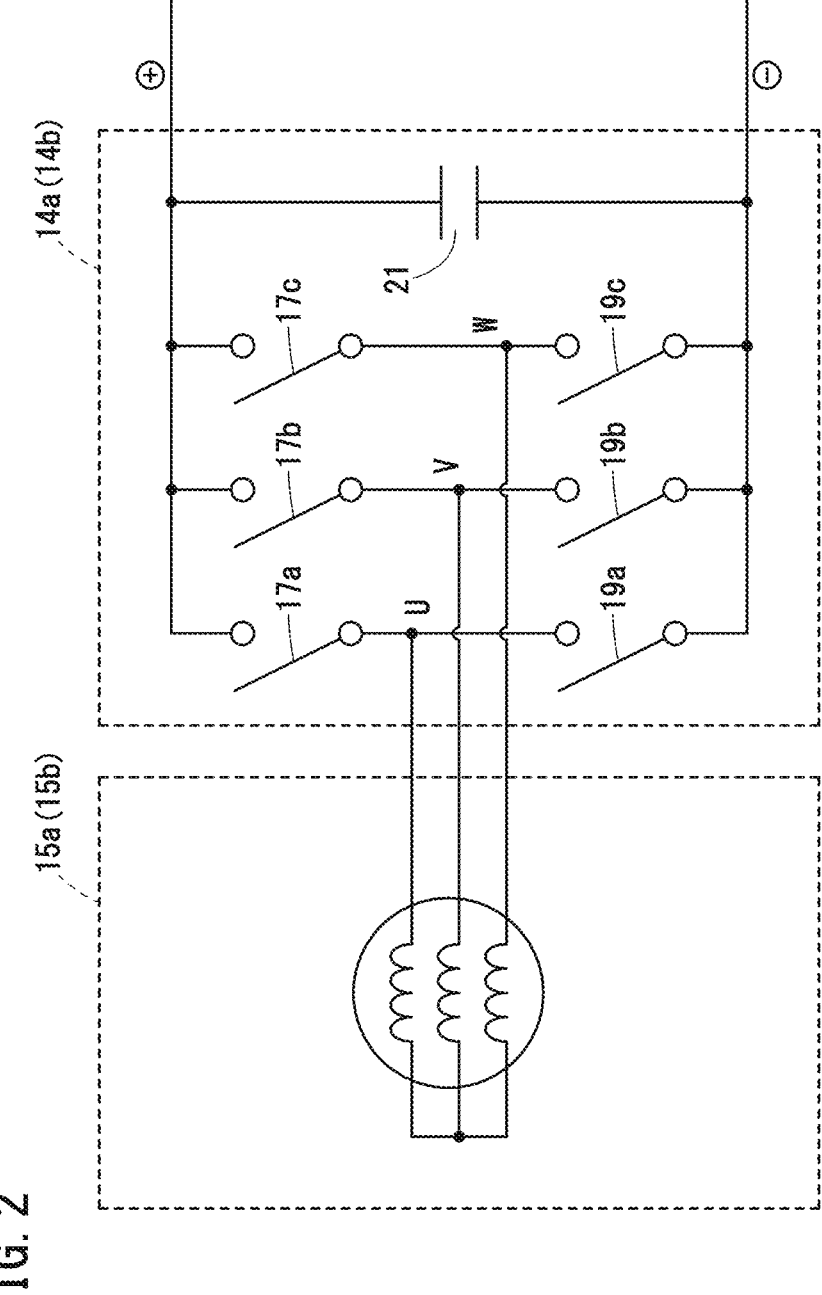
FIG. 2 is a schematic diagram of a first electrical power conversion device according to the first embodiment.

FIG. 2 is a schematic diagram of the first electrical power conversion device 14a according to the present embodiment. The configuration of the second electrical power conversion device 14b is the same as the configuration of the first electrical power conversion device 14a.

The first electrical power conversion device 14a includes upper side arm switching elements 17a to 17c, lower side arm switching elements 19a to 19c, and a smoothing capacitor 21.

The switching elements 17a to 17c and the switching elements 19a to 19c are semiconductor switches such as a MOSFET (Metal Oxide Semiconductor Field Effect Transistor), an IGBT (Insulated Gate Bipolar transistor), or the like. A freewheeling diode may be provided in parallel respectively with each of the switching elements 17a to 17c and the switching elements 19a to 19c.

In the first electrical power conversion device 14a, by an ON and OFF timing of the switching elements 17a to 17c and the switching elements 19a to 19c being controlled, the three-phase AC electrical power output from the first electrical power generating device 15a is rectified, and converted into a DC electrical power. A fluctuation in the voltage of the rectified DC electrical power is suppressed in the smoothing capacitor 21, and a DC electrical power with a stable voltage is output from the first electrical power conversion device 14a.

The first electrical power conversion device 14a and the second electrical power conversion device 14b, apart therefrom, may also include various elements such as various sensors such as voltage sensors, current sensors and the like, fuses, relays, breakers, diodes, transistors, resistors, coils, capacitors, and the like.

The first load device 16a, the second load device 16b, the third load device 16c, and the fourth load device 16d each include an inverter and an electric motor, neither of which is shown. The inverter converts an input DC electrical power into a three-phase AC electrical power, and the electric motor is driven by the three-phase AC electrical power. The first load device 16a, the second load device 16b, the third load device 16c, and the fourth load device 16d may each include a DC/DC converter and a low voltage drive device, neither of which is shown. The DC/DC converter causes the voltage of the input DC electrical power to be reduced, and the low-voltage drive device is driven by the DC electrical power.

The first load device 16a, the second load device 16b, the third load device 16c, and the fourth load device 16d may also include various elements such as various sensors such as voltage sensors, current sensors and the like, fuses, relays, breakers, diodes, transistors, resistors, coils, capacitors, and the like.

The electrical power supply system 10 is equipped with a first connection circuit 18a and a second connection circuit 18b. The first connection circuit 18a is equipped with a first connection device 20a that is capable of connecting the first electrical power supply circuit 12a and the second electrical power supply circuit 12b. The second connection circuit 18b is equipped with a second connection device 20b that is capable of connecting the third electrical power supply circuit 12c and the fourth electrical power supply circuit 12d.

The first connection device 20a is switched, by a non-illustrated contactor, between a state in which the first electrical power supply circuit 12a and the second electrical power supply circuit 12b are connected, and a state in which the first electrical power supply circuit 12a and the second electrical power supply circuit 12b are disconnected. Similarly, the second connection device 20b is switched, by a non-illustrated contactor, between a state in which the third electrical power supply circuit 12c and the fourth electrical power supply circuit 12d are connected, and a state in which the third electrical power supply circuit 12c and the fourth electrical power supply circuit 12d are disconnected.

The first connection device 20a and the second connection device 20b may each include a relay instead of the contactor. The first connection device 20a and the second connection device 20b may each include a breaker instead of the contactor. The first connection device 20a and the second connection device 20b may each include a semiconductor switch instead of the contactor.

Normally, the first electrical power supply circuit 12a and the second electrical power supply circuit 12b are disconnected. Consequently, in the case that an abnormality has occurred in one of the first electrical power supply circuit 12a or the second electrical power supply circuit 12b, it is possible to prevent the abnormality from adversely influencing the other one. For example, in the case that an excessive electrical current has been generated in one of the first electrical power supply circuit 12a or the second electrical power supply circuit 12b, it is possible to prevent the excessive electrical current from flowing to the other one.

In the same manner, normally, the third electrical power supply circuit 12c and the fourth electrical power supply circuit 12d are disconnected. Consequently, in the case that an abnormality has occurred in one of the third electrical power supply circuit 12c or the fourth electrical power supply circuit 12d, it is possible to prevent the abnormality from adversely influencing the other one. For example, in the case that an excessive electrical current has been generated in one of the third electrical power supply circuit 12c or the fourth electrical power supply circuit 12d, it is possible to prevent the excessive electrical current from flowing to the other one.

In the case that the supply of the electrical power from the first electrical power conversion device 14a to the first electrical power supply circuit 12a is cut off, the first electrical power supply circuit 12a and the second electrical power supply circuit 12b are connected to each other by the first connection device 20a. Consequently, the electrical power is supplied from the second electrical power conversion device 14b to the first electrical power supply circuit 12a.

In the case that the supply of the electrical power from the first electrical power conversion device 14a to the third electrical power supply circuit 12c is cut off, the third electrical power supply circuit 12c and the fourth electrical power supply circuit 12d are connected to each other by the second connection device 20b. Consequently, the electrical power is supplied from the second electrical power conversion device 14b to the third electrical power supply circuit 12c.

In the case that the supply of the electrical power from the second electrical power conversion device 14b to the second electrical power supply circuit 12b is cut off, the first electrical power supply circuit 12a and the second electrical power supply circuit 12b are connected to each other by the first connection device 20a. Consequently, the electrical power is supplied from the first electrical power conversion device 14a to the second electrical power supply circuit 12b.

In the case that the supply of the electrical power from the second electrical power conversion device 14b to the fourth electrical power supply circuit 12d is cut off, the third electrical power supply circuit 12c and the fourth electrical power supply circuit 12d are connected to each other by the second connection device 20b. Consequently, the electrical power is supplied from the first electrical power conversion device 14a to the fourth electrical power supply circuit 12d.

The electrical power supply system 10 is equipped with disconnection devices 22a to 22d. The disconnection device 22a is capable of disconnecting the first electrical power conversion device 14a from the first electrical power supply circuit 12a and the first connection circuit 18a. The disconnection device 22b is capable of disconnecting the second electrical power conversion device 14b from the second electrical power supply circuit 12b and the first connection circuit 18a. The disconnection device 22c is capable of disconnecting the first electrical power conversion device 14a from the third electrical power supply circuit 12c and the second connection circuit 18b. The disconnection device 22d is capable of disconnecting the second electrical power conversion device 14b from the fourth electrical power supply circuit 12d and the second connection circuit 18b.

The disconnection device 22a is switched, by a non-illustrated contactor, between a state in which the first electrical power conversion device 14a is disconnected from the first electrical power supply circuit 12a and the first connection circuit 18a, and a state in which the first electrical power conversion device 14a is connected to the first electrical power supply circuit 12a and the first connection circuit 18a. Similarly, the disconnection device 22b is switched, by a non-illustrated contactor, between a state in which the second electrical power conversion device 14b is disconnected from the second electrical power supply circuit 12b and the first connection circuit 18a, and a state in which the second electrical power conversion device 14b is connected to the second electrical power supply circuit 12b and the first connection circuit 18a.

The disconnection device 22c is switched, by a non-illustrated contactor, between a state in which the first electrical power conversion device 14a is disconnected from the third electrical power supply circuit 12c and the second connection circuit 18b, and a state in which the first electrical power conversion device 14a is connected to the third electrical power supply circuit 12c and the second connection circuit 18b. Similarly, the disconnection device 22d is switched, by a non-illustrated contactor, between a state in which the second electrical power conversion device 14b is disconnected from the fourth electrical power supply circuit 12d and the second connection circuit 18b, and a state in which the second electrical power conversion device 14b is connected to the fourth electrical power supply circuit 12d and the second connection circuit 18b.

The disconnection devices 22a to 22d may each include a relay instead of the contactor. The disconnection devices 22a to 22d may each include a breaker instead of the contactor. The disconnection devices 22a to 22d may each include a semiconductor switch instead of the contactor.

The electrical power supply system 10 is equipped with a first electrical power storage device 24a, a second electrical power storage device 24b, a third electrical power storage device 24c, and a fourth electrical power storage device 24d. The first electrical power storage device 24a is connected to the first electrical power supply circuit 12a in parallel with the first electrical power conversion device 14a. The second electrical power storage device 24b is connected to the second electrical power supply circuit 12b in parallel with the second electrical power conversion device 14b. The third electrical power storage device 24c is connected to the third electrical power supply circuit 12c in parallel with the first electrical power conversion device 14a. The fourth electrical power storage device 24d is connected to the fourth electrical power supply circuit 12d in parallel with the second electrical power conversion device 14b.

The first electrical power storage device 24a, the second electrical power storage device 24b, the third electrical power storage device 24c, and the fourth electrical power storage device 24d each include a lithium ion battery. The first electrical power storage device 24a, the second electrical power storage device 24b, the third electrical power storage device 24c, and the fourth electrical power storage device 24d may each include a secondary battery other than a lithium ion battery. The first electrical power storage device 24a, the second electrical power storage device 24b, the third electrical power storage device 24c, and the fourth electrical power storage device 24d may each include a large-capacity capacitor.

The first electrical power storage device 24a, the second electrical power storage device 24b, the third electrical power storage device 24c, and the fourth electrical power storage device 24d may also include various elements such as various sensors such as voltage sensors, current sensors and the like, fuses, relays, breakers, diodes, transistors, resistors, coils, capacitors, and the like.

The electrical power supply system 10 is equipped with disconnection devices 26a to 26d. The disconnection device 26a is capable of disconnecting the first electrical power storage device 24a from the first electrical power supply circuit 12a and the first load device 16a. The disconnection device 26b is capable of disconnecting the second electrical power storage device 24b from the second electrical power supply circuit 12b and the second load device 16b. The disconnection device 26c is capable of disconnecting the third electrical power storage device 24c from the third electrical power supply circuit 12c and the third load device 16c. The disconnection device 26d is capable of disconnecting the fourth electrical power storage device 24d from the fourth electrical power supply circuit 12d and the fourth load device 16d.

The disconnection device 26a is switched, by a non-illustrated contactor, between a state in which the first electrical power storage device 24a is disconnected from the first electrical power supply circuit 12a and the first load device 16a, and a state in which the first electrical power storage device 24a is connected to the first electrical power supply circuit 12a and the first load device 16a. Similarly, the disconnection device 26b is switched, by a non-illustrated contactor, between a state in which the second electrical power storage device 24b is disconnected from the second electrical power supply circuit 12b and the second load device 16b, and a state in which the second electrical power storage device 24b is connected to the second electrical power supply circuit 12b and the second load device 16b.

Further, the disconnection device 26c is switched, by a non-illustrated contactor, between a state in which the third electrical power storage device 24c is disconnected from the third electrical power supply circuit 12c and the third load device 16c, and a state in which the third electrical power storage device 24c is connected to the third electrical power supply circuit 12c and the third load device 16c. Similarly, the disconnection device 26d is switched, by a non-illustrated contactor, between a state in which the fourth electrical power storage device 24d is disconnected from the fourth electrical power supply circuit 12d and the fourth load device 16d, and a state in which the fourth electrical power storage device 24d is connected to the fourth electrical power supply circuit 12d and the fourth load device 16d.

The disconnection devices 26a to 26d may each include a relay instead of the contactor. The disconnection devices 26a to 26d may each include a breaker instead of the contactor. The disconnection devices 26a to 26d may each include a semiconductor switch instead of the contactor.

The electrical power supply system 10 is equipped with reverse flow prevention devices 28a to 28d. The reverse flow prevention device 28a limits the supply of the electrical power from the first electrical power storage device 24a to the first electrical power supply circuit 12a. The reverse flow prevention device 28b limits the supply of the electrical power from the second electrical power storage device 24b to the second electrical power supply circuit 12b. The reverse flow prevention device 28c limits the supply of the electrical power from the third electrical power storage device 24c to the third electrical power supply circuit 12c. The reverse flow prevention device 28d limits the supply of the electrical power from the fourth electrical power storage device 24d to the fourth electrical power supply circuit 12d.

Figure 3:
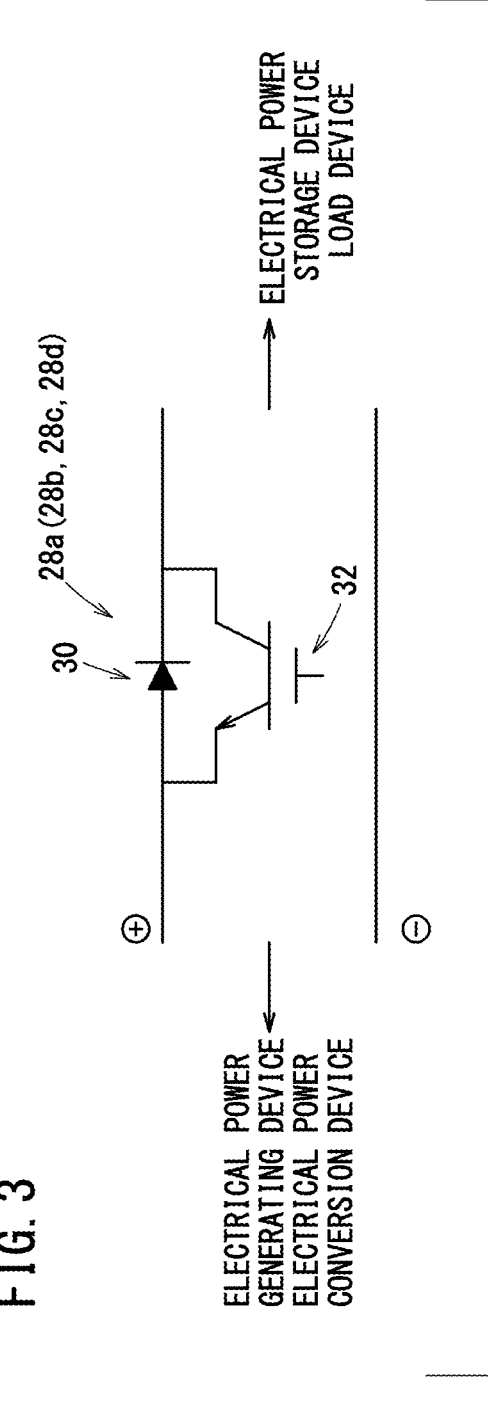
FIG. 3 is a schematic diagram showing the configuration of a reverse flow prevention device in the first embodiment.

FIG. 3 is a schematic diagram showing the configuration of the reverse flow prevention device 28a in the present embodiment. The configuration of the reverse flow prevention devices 28b to 28d is the same as the configuration of the reverse flow prevention device 28a. The reverse flow prevention device 28a includes a diode 30 and a transistor 32.

The diode 30 is disposed in a positive electrode wire. In the case that the voltage of the anode is lower than the voltage of the cathode, almost no electrical current flows through the diode 30. In the case that the voltage of the anode is higher than the voltage of the cathode, and in the case that a potential difference between the cathode and the anode is greater than or equal to a forward voltage, an electrical current flows through the diode 30. Consequently, an electrical power is supplied via the diode 30 from the first electrical power supply circuit 12a to the first load device 16a and the first electrical power storage device 24a. On the other hand, an electrical power is not supplied via the diode 30 from the first load device 16a and the first electrical power storage device 24a to the first electrical power supply circuit 12a.

The transistor 32 is provided to bypass the diode 30. In the case that an electrical current flows from the base to the emitter of the transistor 32, the electrical current flows from the collector to the emitter. Consequently, the electrical power is supplied via the transistor 32 from the first electrical power storage device 24a to the first electrical power supply circuit 12a. In the case that the electrical power is not supplied from the first electrical power storage device 24a to the first electrical power supply circuit 12a, the transistor 32 may be omitted. Instead of the transistor 32, another switching element may be used.

Figure 4:
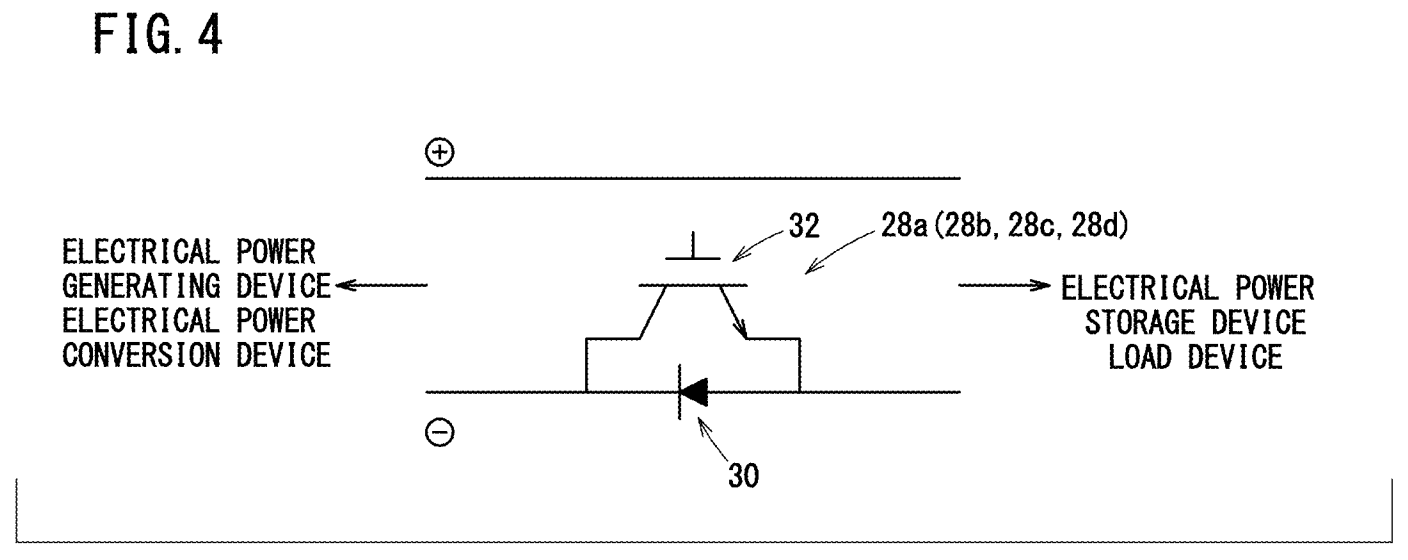

FIG. 4 is a schematic diagram showing the configuration of the reverse flow prevention device 28a in the present embodiment. As shown in FIG. 4, the diode 30 may be provided in a negative electrode wire. Further, the diode 30 may be provided in both the positive electrode wire and the negative electrode wire.

In addition to the configuration described above, the electrical power supply system 10 may include various elements such as various sensors such as a voltage sensor, a current sensor or the like, a fuse, a resistor, a coil, and a capacitor or the like.

Operations of Electrical Power Supply System at Normal Time

Figure 5:
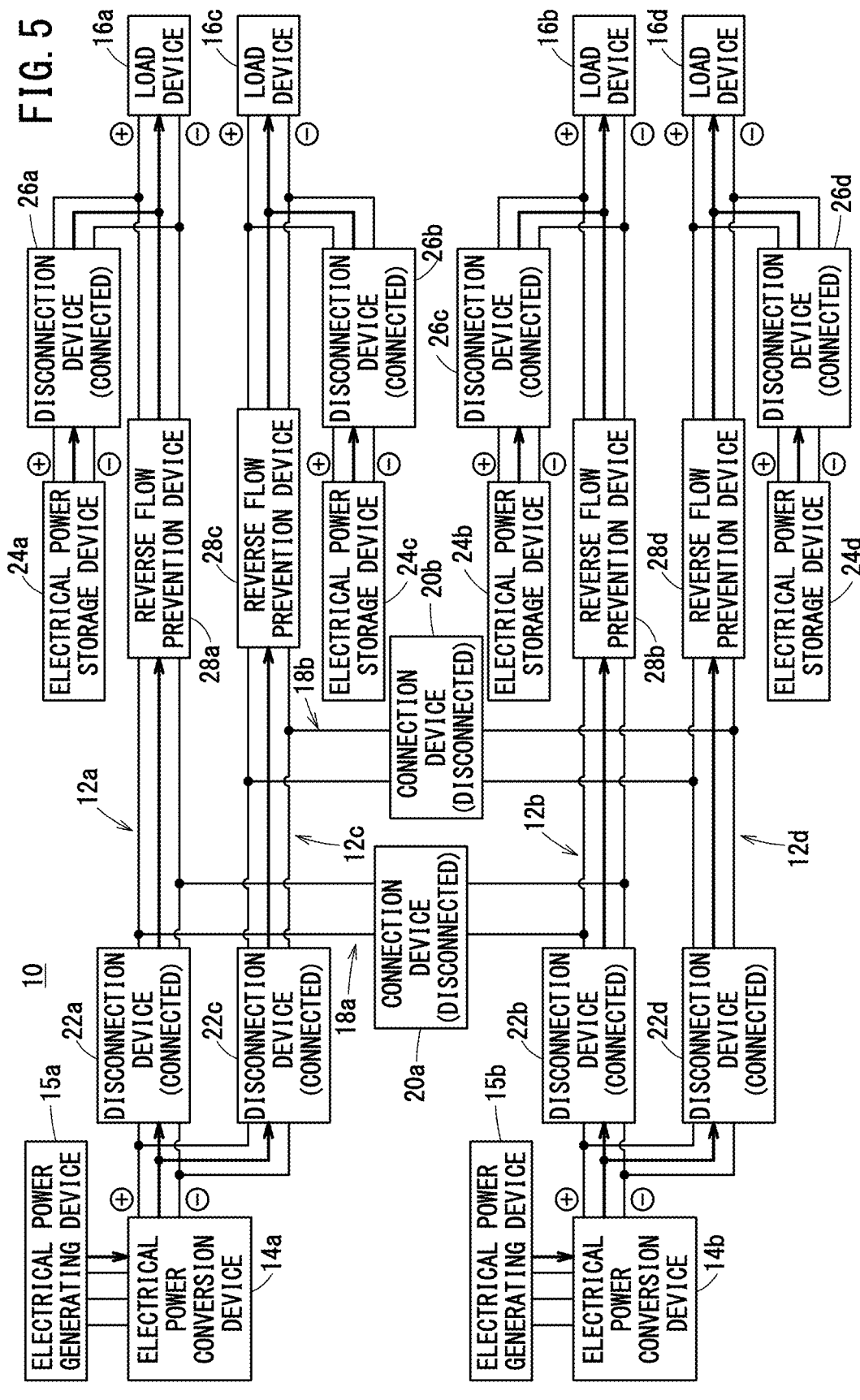
FIG. 5 is a diagram showing operations of the electrical power supply system at a normal time in the first embodiment.

FIG. 5 is a diagram showing operations of the electrical power supply system 10 at a normal time in the present embodiment. The arrows shown in FIG. 5 indicate electrical power supply pathways.

The first electrical power conversion device 14a is connected by the disconnection device 22a to the first electrical power supply circuit 12a, and the first electrical power conversion device 14a is connected by the disconnection device 22c to the third electrical power supply circuit 12c.

Consequently, the three-phase AC electrical power output from the first electrical power generating device 15a is converted into a DC electrical power in the first electrical power conversion device 14a, and is supplied to the first load device 16a and the third load device 16c.

The second electrical power conversion device 14b is connected by the disconnection device 22b to the second electrical power supply circuit 12b, and the second electrical power conversion device 14b is connected by the disconnection device 22d to the fourth electrical power supply circuit 12d. Consequently, the three-phase AC electrical power output from the second electrical power generating device 15b is converted into a DC electrical power in the second electrical power conversion device 14b, and is supplied to the second load device 16b and the fourth load device 16d.

The first electrical power storage device 24a is connected by the disconnection device 26a to the first load device 16a. Consequently, a DC electrical power output from the first electrical power storage device 24a is supplied to the first load device 16a. The second electrical power storage device 24b is connected by the disconnection device 26b to the second load device 16b. Consequently, a DC electrical power output from the second electrical power storage device 24b is supplied to the second load device 16b. The third electrical power storage device 24c is connected by the disconnection device 26c to the third load device 16c. Consequently, a DC electrical power output from the third electrical power storage device 24c is supplied to the third load device 16c. The fourth electrical power storage device 24d is connected by the disconnection device 26d to the fourth load device 16d. Consequently, a DC electrical power output from the fourth electrical power storage device 24d is supplied to the fourth load device 16d.

At a normal time, the first electrical power supply circuit 12a and the second electrical power supply circuit 12b are disconnected by the first connection device 20a, and the third electrical power supply circuit 12c and the fourth electrical power supply circuit 12d are disconnected by the second connection device 20b.

Operations of Electrical Power Supply System at Time of Abnormality

FIG. 6 to FIG. 9 are diagrams showing operations of the electrical power supply system 10 at a time of an abnormality in the present embodiment. The arrows shown in FIG. 6 to FIG. 9 indicate electrical power supply pathways. FIG. 6 to FIG. 9 show the operations of the electrical power supply system 10 in the case that the supply of the electrical power from the first electrical power conversion device 14a to the first electrical power supply circuit 12a and the third electrical power supply circuit 12c is cut off.

The state in which the supply of the electrical power from the first electrical power conversion device 14a to the first electrical power supply circuit 12a and the third electrical power supply circuit 12c is cut off, for example, is a state in which the first electrical power generating device 15a is stopped, and the first electrical power generating device 15a is incapable of being restarted. Further, this is a state in which a short circuit, a wire breakage, or the like has occurred between the first electrical power conversion device 14a and the disconnection device 22a, or alternatively, between the first electrical power conversion device 14a and the disconnection device 22c.

Figure 6:
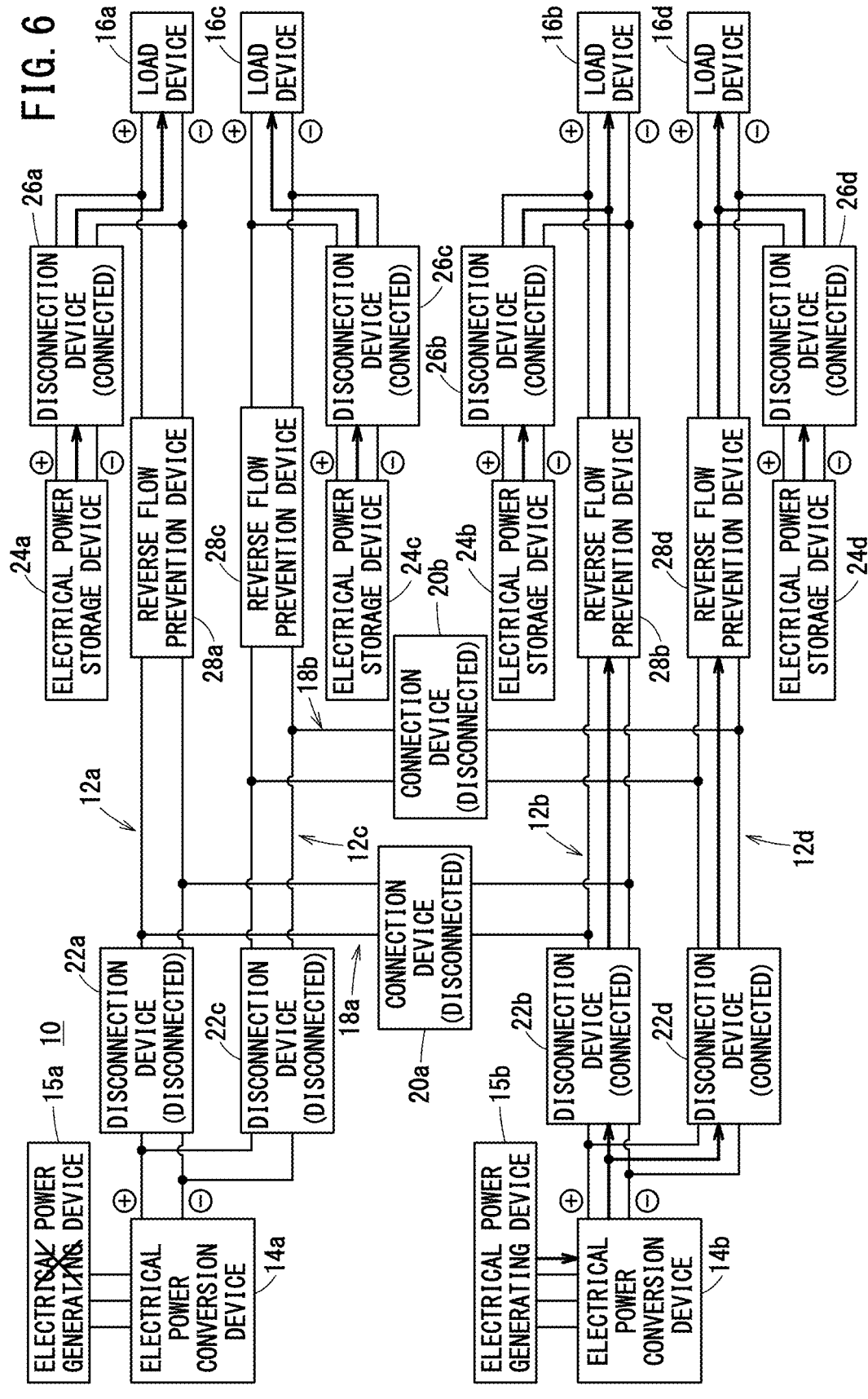
FIG. 6 is a diagram showing operations of the electrical power supply system at a time of an abnormality in the first embodiment.

In the case that the supply of the electrical power from the first electrical power conversion device 14a to the first electrical power supply circuit 12a and the third electrical power supply circuit 12c is cut off, then as shown in FIG. 6, the first electrical power conversion device 14a is disconnected by the disconnection device 22a from the first electrical power supply circuit 12a and the first connection circuit 18a. Further, the first electrical power conversion device 14a is disconnected by the disconnection device 22c from the third electrical power supply circuit 12c and the second connection circuit 18b. In this case, the electrical power is supplied to the first load device 16a only from the first electrical power storage device 24a. Further, the electrical power is supplied to the third load device 16c only from the third electrical power storage device 24c.

Figure 7:
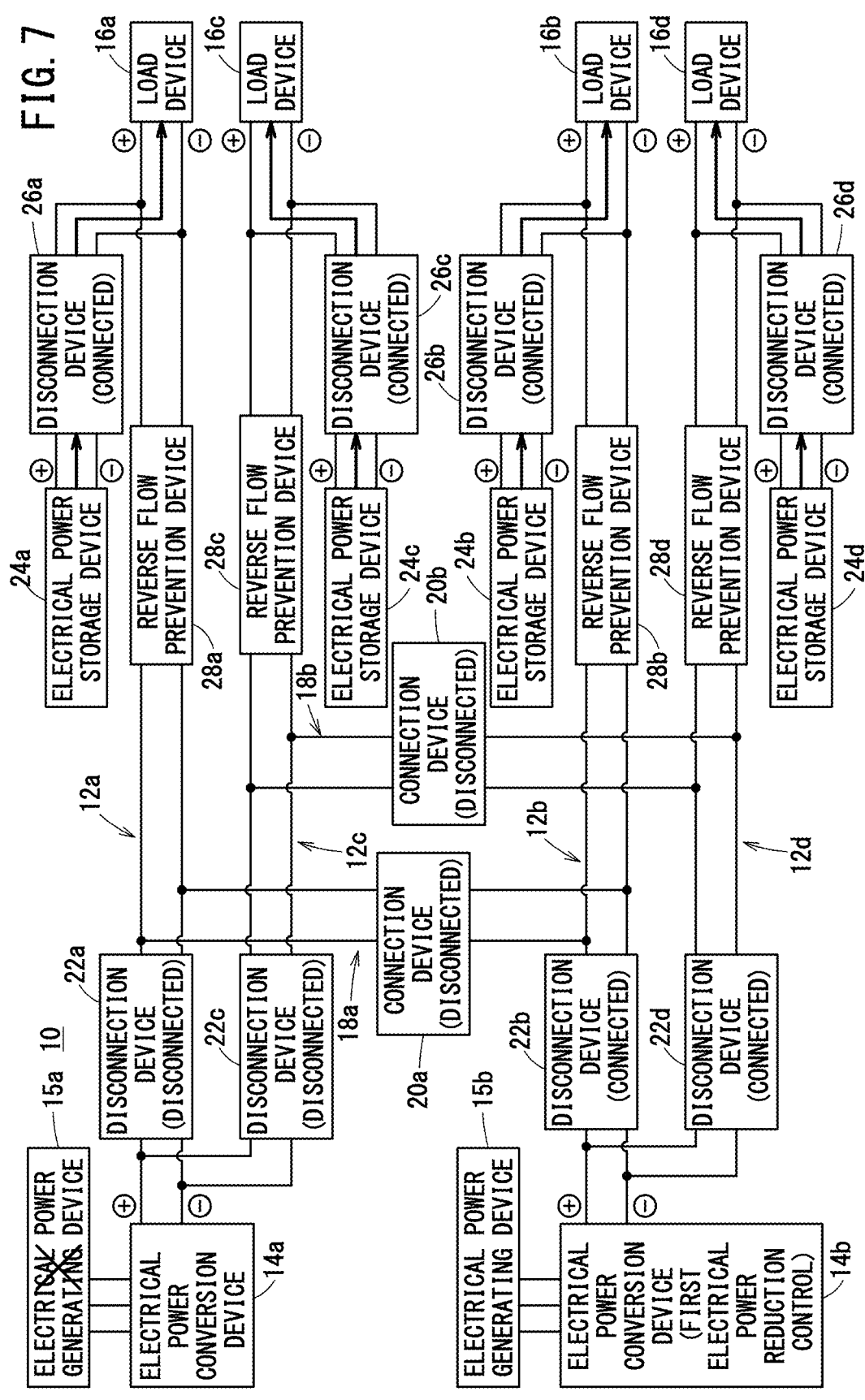
FIG. 7 is a diagram showing operations of the electrical power supply system at a time of an abnormality in the first embodiment.

Thereafter, as shown in FIG. 7, a first electrical power reduction control is executed on the second electrical power conversion device 14b. The first electrical power reduction control is a control in which the output of the second electrical power generating device 15b is short circuited by the second electrical power conversion device 14b, and thereby the DC electrical power output from the second electrical power conversion device 14b is reduced.

Figure 10:
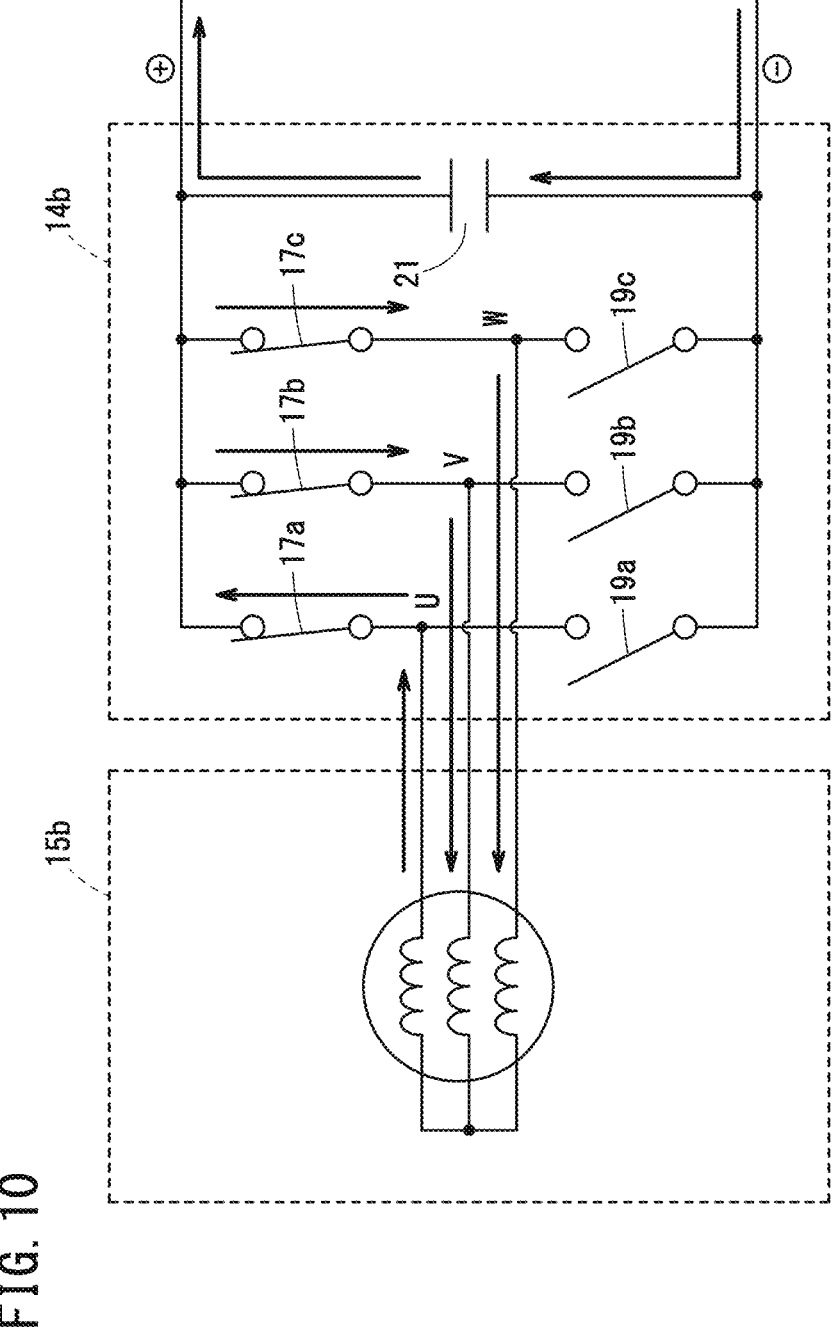
FIG. 10 is a schematic diagram showing the state of a second electrical power conversion device when a first electrical power reduction control is executed.

FIG. 10 is a schematic diagram showing the state of the second electrical power conversion device 14b when the first electrical power reduction control is executed. As shown in FIG. 10, each of the upper side arm switching elements 17a to 17c is turned ON (placed in the connected state). The phase of the U-phase voltage, the phase of the V-phase voltage, and the phase of the W-phase voltage of the second electrical power generating device 15b are shifted by 120 degrees, respectively. By the output of the second electrical power generating device 15b being short circuited, the U-phase voltage, the V-phase voltage, and the W-phase voltage cancel each other out, and the output voltage of the second electrical power generating device 15b can be made zero. Consequently, only the DC electrical power that is stored in the smoothing capacitor 21 is output from the second electrical power conversion device 14b.

In the case that the first electrical power reduction control is executed, each of the lower side arm switching elements 19a to 19c arm may be turned ON (placed in the connected state). In the case that each of the lower side arm switching elements 19a to 19c is turned ON (placed in the connected state), the output voltage of the second electrical power generating device 15b can be made zero.

Figure 8:
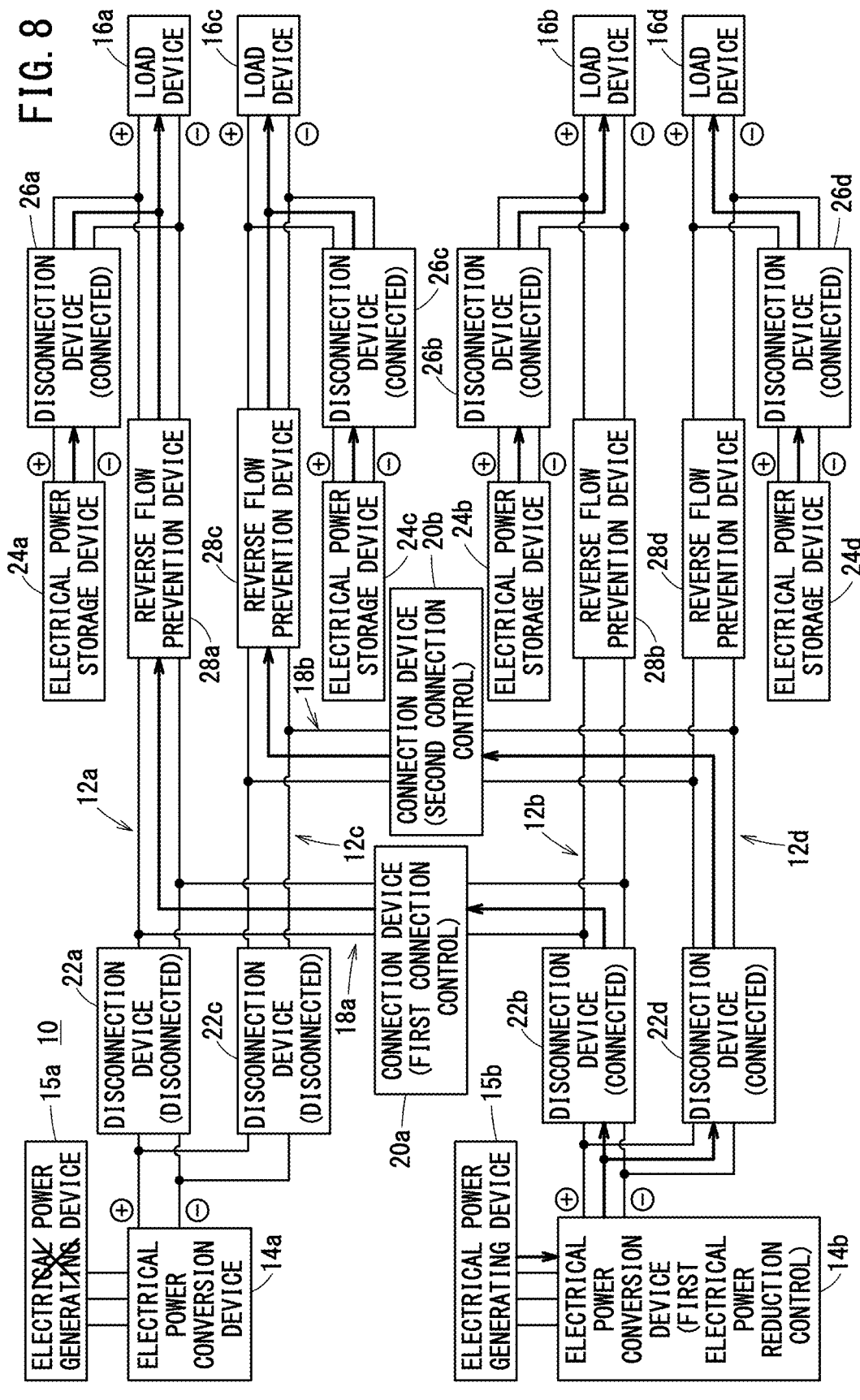
FIG. 8 is a diagram showing operations of the electrical power supply system at a time of an abnormality in the first embodiment.

After the first electrical power reduction control has been executed on the second electrical power conversion device 14b, a first connection control is executed on the first connection device 20a as shown in FIG. 8 in a state in which the first electrical power reduction control is continued. By the first connection control being executed, the first electrical power supply circuit 12a and the second electrical power supply circuit 12b are connected to each other. At this time, since the voltage of the first electrical power supply circuit 12a is lower than the voltage of the second electrical power supply circuit 12b, a comparatively large electrical current flows to the first connection circuit 18a and the first electrical power supply circuit 12a. However, since the first electrical power reduction control is being executed, in comparison to a case in which the first electrical power reduction control is not being executed, the electrical current that flows to the first connection circuit 18a and the first electrical power supply circuit 12a can be made smaller. Therefore, it is possible to prevent or suppress damage from occurring to the first load device 16a and the first electrical power storage device 24a.

Further, after the first electrical power reduction control has been executed on the second electrical power conversion device 14b, a second connection control is executed on the second connection device 20b as shown in FIG. 8 in a state in which the first electrical power reduction control is continued. By the second connection control being executed, the third electrical power supply circuit 12c and the fourth electrical power supply circuit 12d are connected to each other. At this time, since the voltage of the third electrical power supply circuit 12c is lower than the voltage of the fourth electrical power supply circuit 12d, a comparatively large electrical current flows to the second connection circuit 18b and the third electrical power supply circuit 12c. However, since the first electrical power reduction control is being executed, in comparison to a case in which the first electrical power reduction control is not being executed, the electrical current that flows to the second connection circuit 18b and the third electrical power supply circuit 12c can be made smaller. Therefore, it is possible to prevent or suppress damage from occurring to the third load device 16c and the third electrical power storage device 24c.

Figure 9:
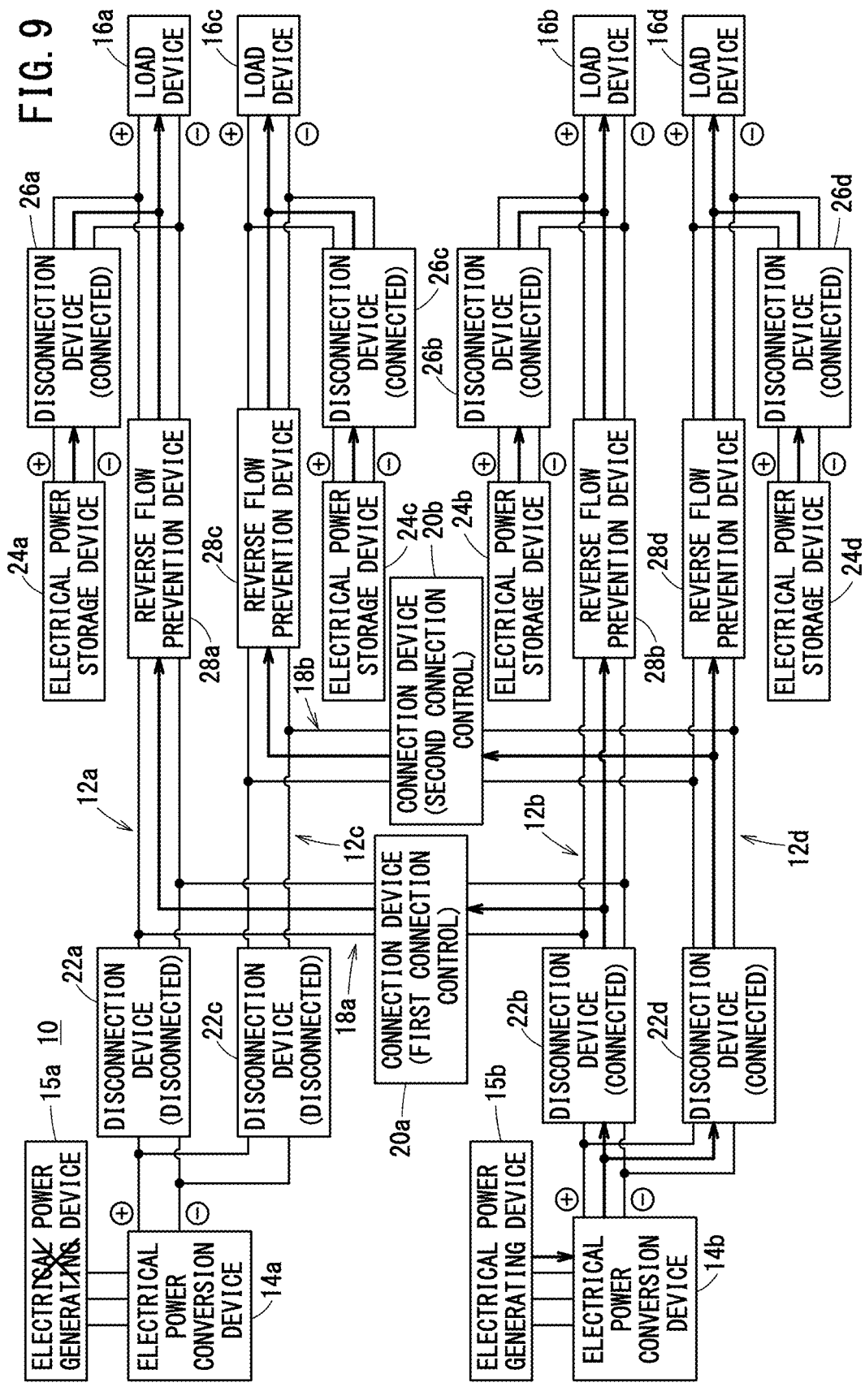
FIG. 9 is a diagram showing operations of the electrical power supply system at a time of an abnormality in the first embodiment.

In the next case, as shown in FIG. 9, the first electrical power reduction control for the second electrical power conversion device 14b is terminated. Such a case is a case in which the difference between the voltage of the first electrical power supply circuit 12a and the voltage of the second electrical power supply circuit 12b is less than or equal to a predetermined voltage threshold value, and is a case in which the difference between the voltage of the third electrical power supply circuit 12c and the voltage of the fourth electrical power supply circuit 12d is less than or equal to a predetermined voltage threshold value. Consequently, the three-phase AC electrical power of the second electrical power generating device 15b is converted into a DC electrical power in the second electrical power conversion device 14b, and is supplied to the first load device 16a and the third load device 16c. Consequently, the first load device 16a and the third load device 16c can continue to be driven.

Configuration of Control Device

Figure 11:
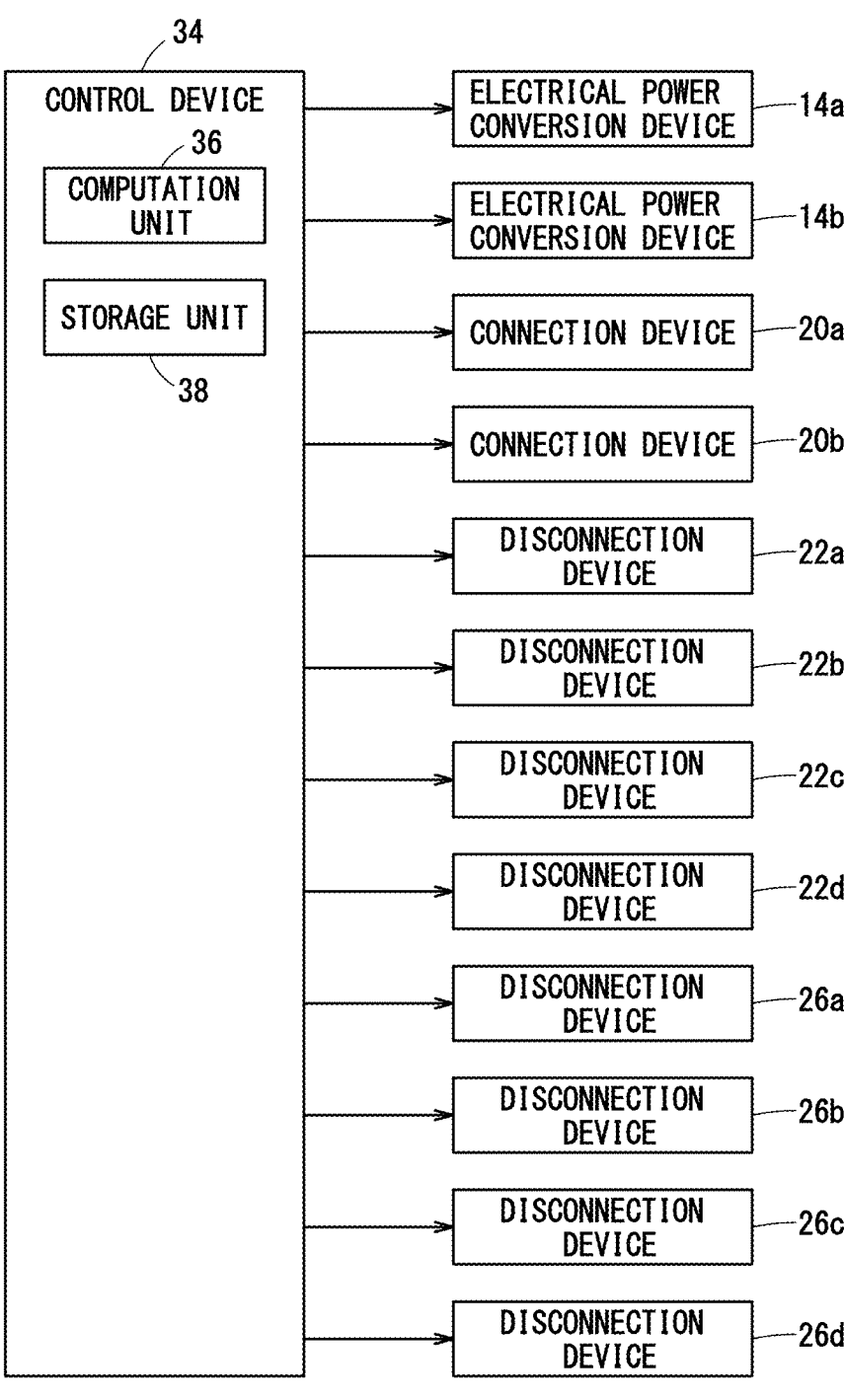
FIG. 11 is a control block diagram of a control device according to the first embodiment.

The electrical power supply system 10 is equipped with a control device 34. FIG. 11 is a control block diagram of the control device 34 in the present embodiment. The control device 34 controls the first electrical power conversion device 14a, the second electrical power conversion device 14b, the first connection device 20a, the second connection device 20b, the disconnection devices 22a to 22d, and the disconnection devices 26a to 26d. The control device 34 may control the first connection device 20a, the second connection device 20b, the disconnection devices 22a to 22d, and the disconnection devices 26a to 26d, and a control device other than the control device 34 may control the first electrical power conversion device 14a and the second electrical power conversion device 14b.

The control device 34 includes a computation unit 36 and a storage unit 38. The computation unit 36 includes a processor such as a CPU (Central Processing Unit) or a GPU (Graphics Processing Unit) or the like. The computation unit 36 controls each of respective devices by executing a program that is stored in the storage unit 38. At least a portion of the computation unit 36 may be realized by an integrated circuit such as an ASIC (Application Specific Integrated Circuit) or an FPGA (Field-Programmable Gate Array) or the like. At least a portion of the computation unit 36 may be realized by an electronic circuit including a discrete device.

The storage unit 38 is constituted by a volatile memory and a non-volatile memory (neither of which is shown), which are computer readable non-transitory storage media. The volatile memory, for example, is a RAM (Random Access Memory) or the like. The non-volatile memory, for example, is a ROM (Read Only Memory), a flash memory, or the like. Data and the like are stored, for example, in the volatile memory. A program, a table, a map and the like are stored, for example, in the non-volatile memory. At least a portion of the storage unit 38 may be provided in the processor, the integrated circuit, or the like described above.

Failsafe Control

Figure 12:
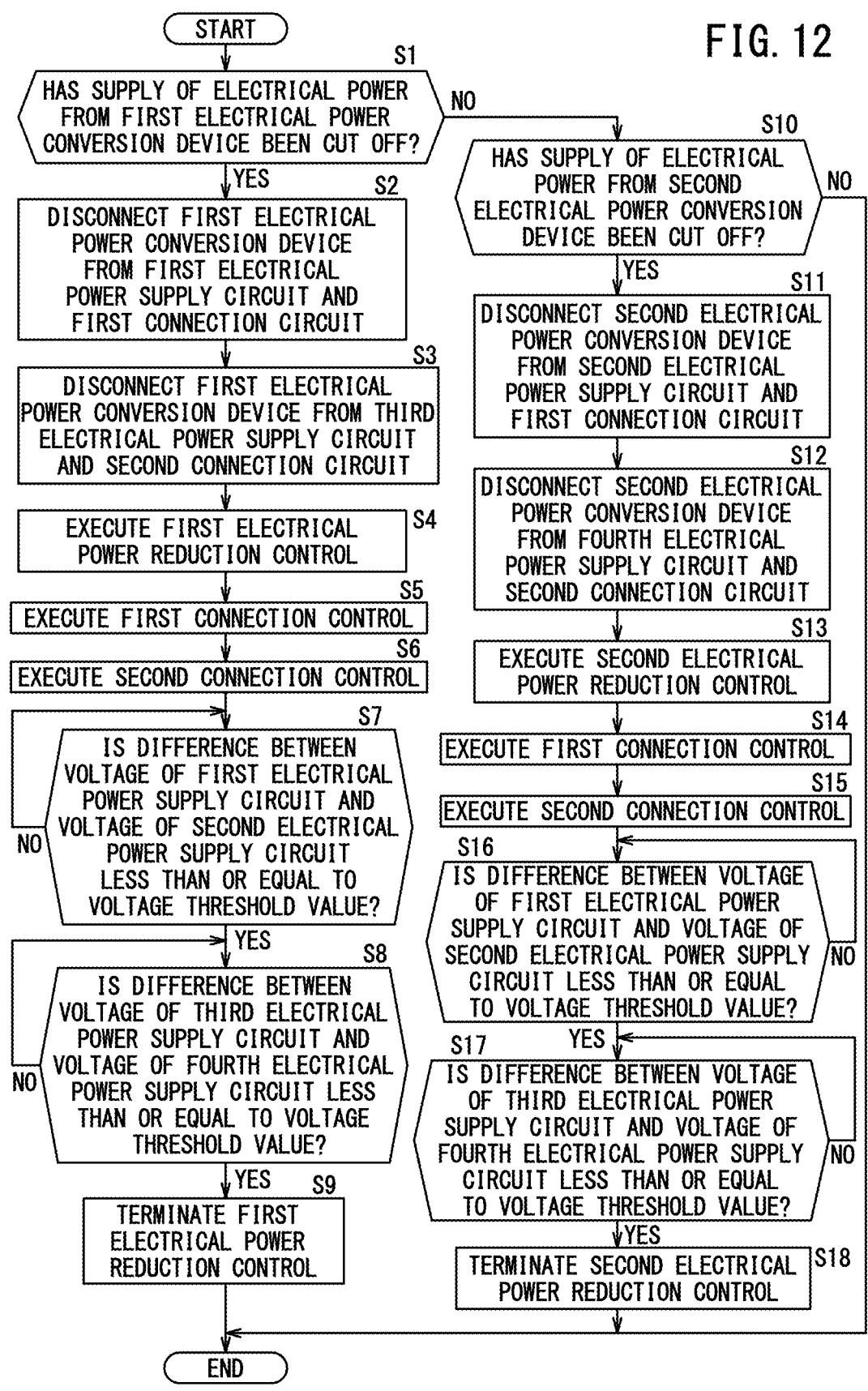
FIG. 12 is a flowchart showing a failsafe control in the first embodiment.

FIG. 12 is a flowchart showing a failsafe control in the present embodiment. The failsafe control is repeatedly executed at a predetermined cycle.

In step S1, the control device 34 determines whether or not the supply of the electrical power from the first electrical power conversion device 14a to the first electrical power supply circuit 12a and the third electrical power supply circuit 12c has been cut off. In the case it is determined that the supply of the electrical power from the first electrical power conversion device 14a to the first electrical power supply circuit 12a and the third electrical power supply circuit 12c has been cut off (step S1: YES), the process transitions to step S2.

In step S2, the control device 34 controls the disconnection device 22a, and thereby disconnects the first electrical power conversion device 14a from the first electrical power supply circuit 12a and the first connection circuit 18a. Thereafter, the process transitions to step S3.

In step S3, the control device 34 controls the disconnection device 22c, and thereby disconnects the first electrical power conversion device 14a from the third electrical power supply circuit 12c and the second connection circuit 18b. Thereafter, the process transitions to step S4.

In step S4, the control device 34 executes the first electrical power reduction control on the second electrical power conversion device 14b. Consequently, the electrical power output from the second electrical power conversion device 14b is made small. Thereafter, the process transitions to step S5. In the case that the second electrical power conversion device 14b is controlled by a control device other than the control device 34, the other control device may execute the first electrical power reduction control on the second electrical power conversion device 14b.

In step S5, the control device 34 executes the first connection control on the first connection device 20a. Consequently, via the first connection circuit 18a, the first electrical power supply circuit 12a and the second electrical power supply circuit 12b are connected. Thereafter, the process transitions to step S6.

In step S6, the control device 34 executes the second connection control on the second connection device 20b. Consequently, via the second connection circuit 18b, the third electrical power supply circuit 12c and the fourth electrical power supply circuit 12d are connected. Thereafter, the process transitions to step S7.

In step S7, the control device 34 determines whether or not the difference between the voltage of the first electrical power supply circuit 12a and the voltage of the second electrical power supply circuit 12b is less than or equal to a predetermined voltage threshold value. In the case it is determined that the difference between the voltage of the first electrical power supply circuit 12a and the voltage of the second electrical power supply circuit 12b is less than or equal to the predetermined voltage threshold value, the process transitions to step S8. In the case it is determined that the difference between the voltage of the first electrical power supply circuit 12a and the voltage of the second electrical power supply circuit 12b is greater than the predetermined voltage threshold value, the process of step S7 is repeated.

In step S8, the control device 34 determines whether or not the difference between the voltage of the third electrical power supply circuit 12c and the voltage of the fourth electrical power supply circuit 12d is less than or equal to a predetermined voltage threshold value. In the case it is determined that the difference between the voltage of the third electrical power supply circuit 12c and the voltage of the fourth electrical power supply circuit 12d is less than or equal to the predetermined voltage threshold value, the process transitions to step S9. In the case it is determined that the difference between the voltage of the third electrical power supply circuit 12c and the voltage of the fourth electrical power supply circuit 12d is greater than the predetermined voltage threshold value, the process of step S8 is repeated.

In step S9, the control device 34 terminates the first electrical power reduction control for the second electrical power conversion device 14b. Thereafter, the failsafe control is terminated. Moreover, the process of step S7 and the process of step S8 may be omitted, and the first electrical power reduction control may be terminated after a predetermined time threshold value has elapsed from a point in time at which the second connection control was executed. In the case that the second electrical power conversion device 14b is controlled by a control device other than the control device 34, the other control device may terminate the first electrical power reduction control for the second electrical power conversion device 14b.

In step S1, in the case it is determined that the electrical power is being supplied from the first electrical power conversion device 14a to the first electrical power supply circuit 12a and the third electrical power supply circuit 12c (step S1: NO), the process transitions to step S10.

In step S10, the control device 34 determines whether or not the supply of the electrical power from the second electrical power conversion device 14b to the second electrical power supply circuit 12b and the fourth electrical power supply circuit 12d has been cut off. In the case it is determined that the supply of the electrical power from the second electrical power conversion device 14b to the second electrical power supply circuit 12b and the fourth electrical power supply circuit 12d has been cut off (step S10: YES), the process transitions to step S11. In the case it is determined that the electrical power is being supplied from the second electrical power conversion device 14b to the second electrical power supply circuit 12b and the fourth electrical power supply circuit 12d (step S10: NO), the failsafe control is terminated.

In step S11, the control device 34 controls the disconnection device 22b, and thereby disconnects the second electrical power conversion device 14b from the second electrical power supply circuit 12b and the first connection circuit 18a. Thereafter, the process transitions to step S12.

In step S12, the control device 34 controls the disconnection device 22d, and thereby disconnects the second electrical power conversion device 14b from the fourth electrical power supply circuit 12d and the second connection circuit 18b. Thereafter, the process transitions to step S13.

In step S13, the control device 34 executes a second electrical power reduction control on the first electrical power conversion device 14a. The second electrical power reduction control is a control in which the output of the first electrical power generating device 15a is short circuited in the first electrical power conversion device 14a, and thereby the DC electrical power output from the first electrical power conversion device 14a is reduced. Thereafter, the process transitions to step S14. In the case that the first electrical power conversion device 14a is controlled by a control device other than the control device 34, the other control device may execute the second electrical power reduction control on the first electrical power conversion device 14a.

In step S14, the control device 34 executes the first connection control on the first connection device 20a. Consequently, via the first connection circuit 18a, the first electrical power supply circuit 12a and the second electrical power supply circuit 12b are connected. Thereafter, the process transitions to step S15.

In step S15, the control device 34 executes the second connection control on the second connection device 20b. Consequently, via the second connection circuit 18b, the third electrical power supply circuit 12c and the fourth electrical power supply circuit 12d are connected. Thereafter, the process transitions to step S16.

In step S16, the control device 34 determines whether or not the difference between the voltage of the first electrical power supply circuit 12a and the voltage of the second electrical power supply circuit 12b is less than or equal to a predetermined voltage threshold value. In the case it is determined that the difference between the voltage of the first electrical power supply circuit 12a and the voltage of the second electrical power supply circuit 12b is less than or equal to the predetermined voltage threshold value, the process transitions to step S17. In the case it is determined that the difference between the voltage of the first electrical power supply circuit 12a and the voltage of the second electrical power supply circuit 12b is greater than the predetermined voltage threshold value, the process of step S16 is repeated.

In step S17, the control device 34 determines whether or not the difference between the voltage of the third electrical power supply circuit 12c and the voltage of the fourth electrical power supply circuit 12d is less than or equal to a predetermined voltage threshold value. In the case it is determined that the difference between the voltage of the third electrical power supply circuit 12c and the voltage of the fourth electrical power supply circuit 12d is less than or equal to the predetermined voltage threshold value, the process transitions to step S18. In the case it is determined that the difference between the voltage of the third electrical power supply circuit 12c and the voltage of the fourth electrical power supply circuit 12d is greater than the predetermined voltage threshold value, the process of step S17 is repeated.

In step S18, the control device 34 terminates the second electrical power reduction control for the first electrical power conversion device 14a. Thereafter, the failsafe control is terminated. Moreover, the process of step S16 and the process of step S17 may be omitted, and the second electrical power reduction control may be terminated after a predetermined time threshold value has elapsed from a point in time at which the second connection control was executed. In the case that the first electrical power conversion device 14a is controlled by a control device other than the control device 34, the other control device may terminate the second electrical power reduction control for the first electrical power conversion device 14a.

Comparison Between Electrical Power Supply System of Present Embodiment and Electrical Power Supply System of Comparative Example 1

Figure 13:
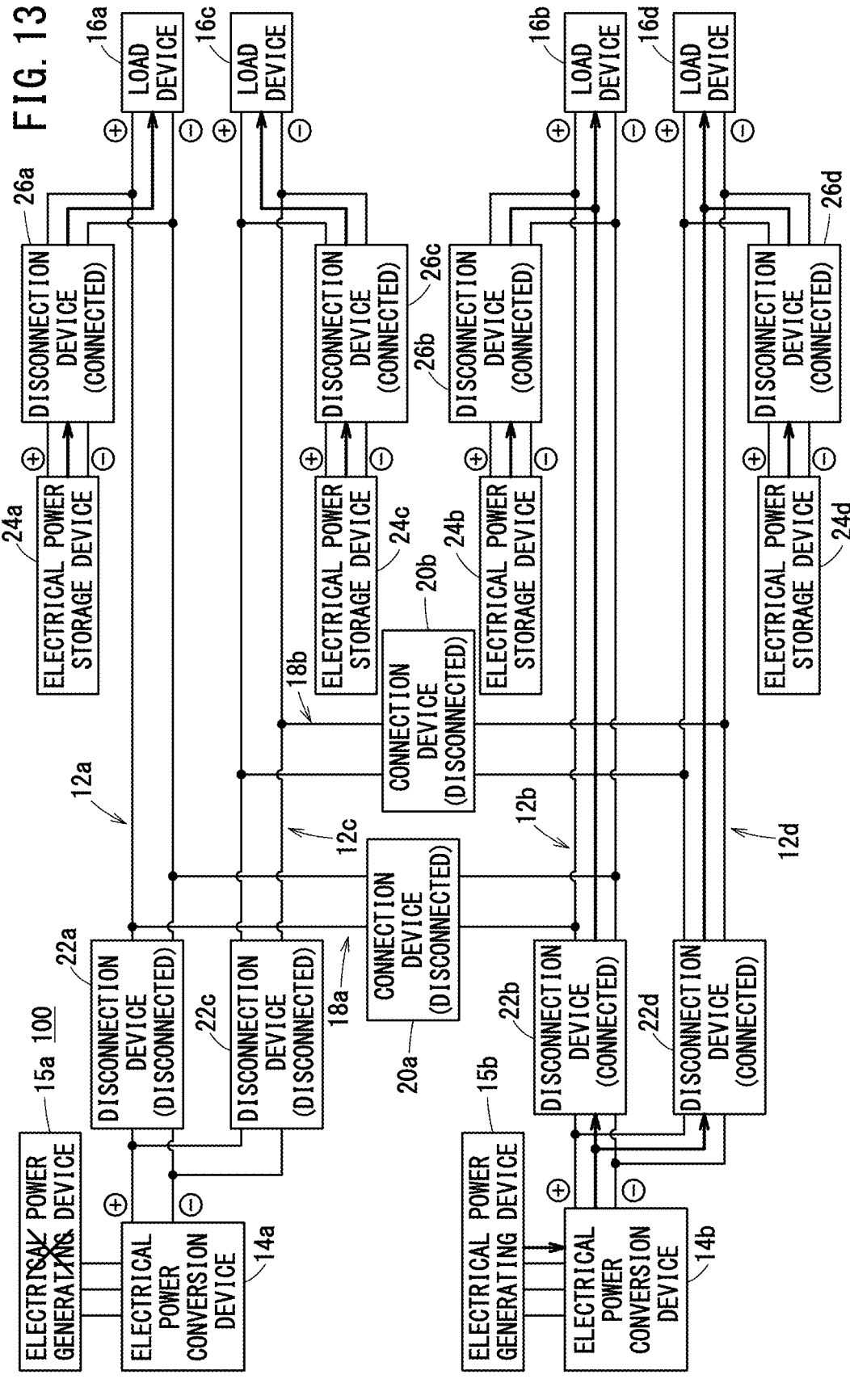
FIG. 13 is a diagram showing operations of an electrical power supply system at a time of an abnormality in Comparative Example 1.
Figure 14:
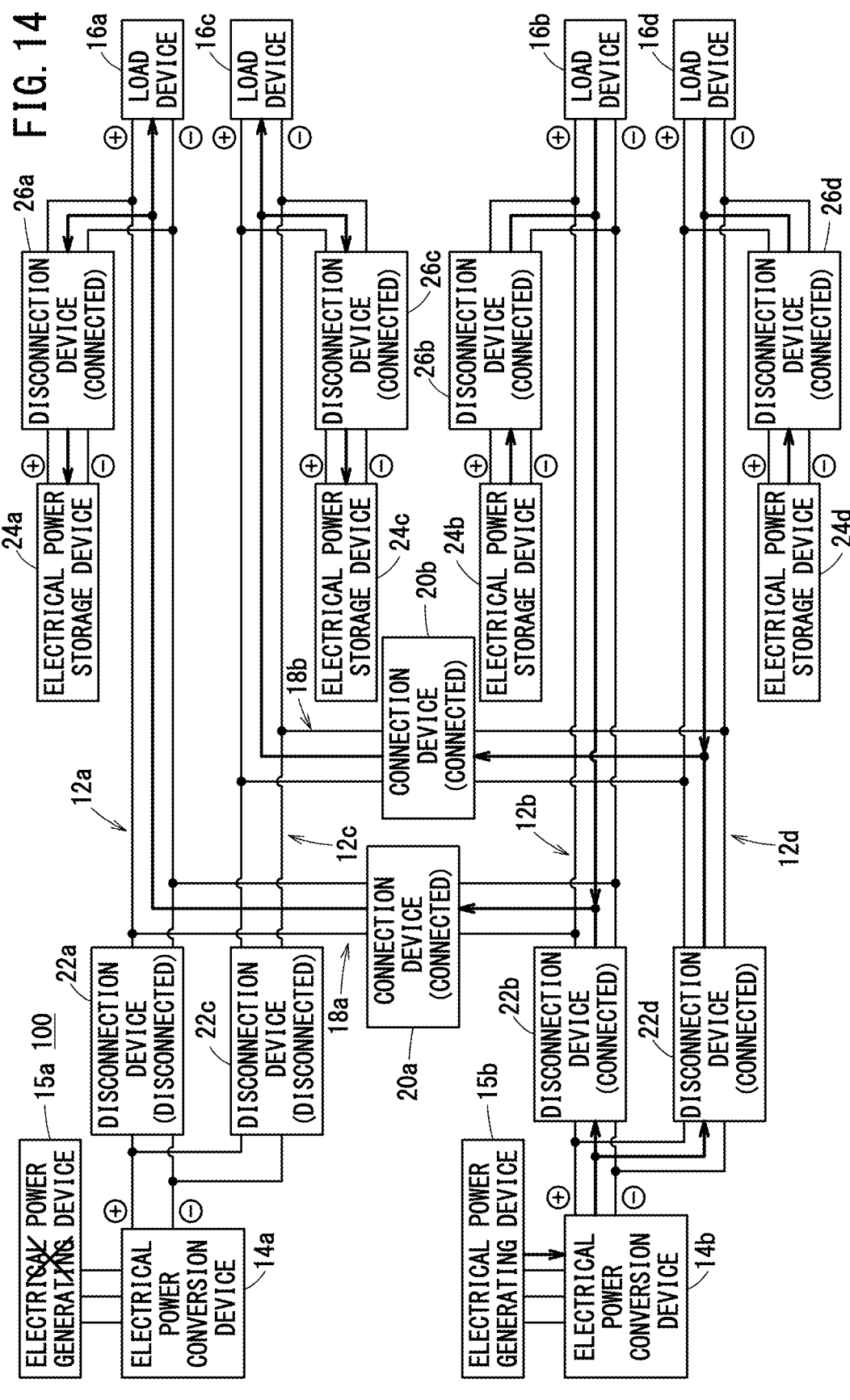
FIG. 14 is a diagram showing operations of the electrical power supply system at a time of an abnormality in Comparative Example 1.

FIG. 13 and FIG. 14 are diagrams illustrating operations of an electrical power supply system 100 at a time of an abnormality in Comparative Example 1. Unlike the electrical power supply system 10 of the present embodiment (refer to FIG. 1), the electrical power supply system 100 of Comparative Example 1 shown in FIG. 13 does not include the reverse flow prevention devices 28a to 28d. FIG. 13 and FIG. 14 show the operations of the electrical power supply system 100 in the case that the supply of the electrical power from the first electrical power conversion device 14a to the first electrical power supply circuit 12a and the third electrical power supply circuit 12c is cut off.

In this case, the first electrical power conversion device 14a is disconnected by the disconnection device 22a from the first electrical power supply circuit 12a and the first connection circuit 18a. Further, the first electrical power conversion device 14a is disconnected by the disconnection device 22c from the third electrical power supply circuit 12c and the second connection circuit 18b.

The first load device 16a is supplied with electrical power only from the first electrical power storage device 24a, and the third load device 16c is supplied with electrical power only from the third electrical power storage device 24c. Therefore, the SOC of the first electrical power storage device 24a and the SOC of the third electrical power storage device 24c decrease. Accompanying this decrease, the output voltage of the first electrical power storage device 24a and the output voltage of the third electrical power storage device 24c decrease. On the other hand, the second load device 16b is supplied with electrical power from the second electrical power conversion device 14b and the second electrical power storage device 24b, and the fourth load device 16d is supplied with electrical power from the second electrical power conversion device 14b and the fourth electrical power storage device 24d. Consequently, the SOC of the second electrical power storage device 24b and the SOC of the fourth electrical power storage device 24d do not significantly decrease. Therefore, the output voltage of the second electrical power storage device 24b and the output voltage of the fourth electrical power storage device 24d do not significantly decrease. As a result, the output voltage of the first electrical power storage device 24a and the output voltage of the third electrical power storage device 24c become lower than the output voltage of the second electrical power storage device 24b and the output voltage of the fourth electrical power storage device 24d.

The electrical power supply system 100 does not include the reverse flow prevention device 28b and the reverse flow prevention device 28d. Since the second electrical power storage device 24b and the fourth electrical power storage device 24d stably output the voltage, the output voltage of the second electrical power conversion device 14b becomes substantially the same voltage as the output voltage of the second electrical power storage device 24b and the output voltage of the fourth electrical power storage device 24d.

In this state, in the case that the first electrical power supply circuit 12a and the second electrical power supply circuit 12b are connected by the first connection device 20a as shown in FIG. 14, a concern arises in that an excessive electrical current may flow to the first electrical power supply circuit 12a and the second electrical power supply circuit 12b. Similarly, in the case that the third electrical power supply circuit 12c and the fourth electrical power supply circuit 12*d* are connected by the second connection device 20*b*, a concern arises in that an excessive electrical current may flow to the third electrical power supply circuit 12*c* and the fourth electrical power supply circuit 12*d*. Therefore, there is a possibility that the second electrical power conversion device 14*b*, the first load device 16*a*, the second load device 16*b*, the third load device 16*c*, the fourth load device 16*d*, the first electrical power storage device 24*a*, the second electrical power storage device 24*b*, the third electrical power storage device 24*c*, and the fourth electrical power storage device 24*d* may become damaged.

Figure 15:
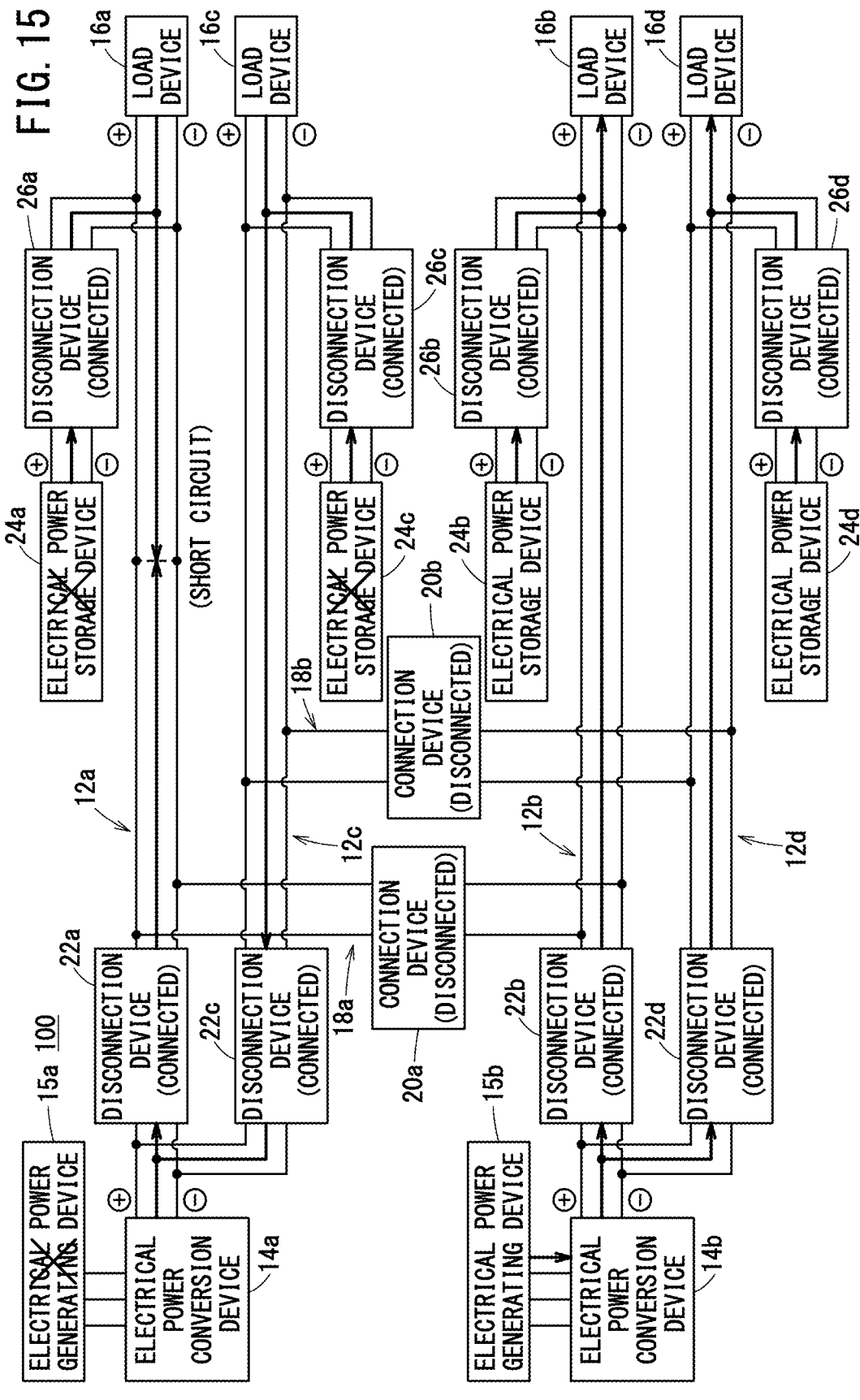
FIG. 15 is a diagram showing operations of the electrical power supply system at a time of an abnormality in Comparative Example 1.

FIG. 15 is a diagram showing operations of the electrical power supply system 100 at a time of an abnormality in Comparative Example 1. FIG. 15 shows a state in which a short circuit occurs between the disconnection device 22*a*, and the first load device 16*a* and the first electrical power storage device 24*a*.

In this case, a concern arises in that an excessive electrical current may flow between a short circuited location, and the first electrical power conversion device 14*a*, the first load device 16*a*, the first electrical power storage device 24*a*, the third load device 16*c*, and the third electrical power storage device 24*c*. Therefore, there is a possibility that the first electrical power conversion device 14*a*, the first load device 16*a*, the first electrical power storage device 24*a*, the third load device 16*c*, and the third electrical power storage device 24*c* may become damaged. As a result, a concern arises in that the driving of the first load device 16*a* and the third load device 16*c* may not be capable of continuing.

Figure 16:
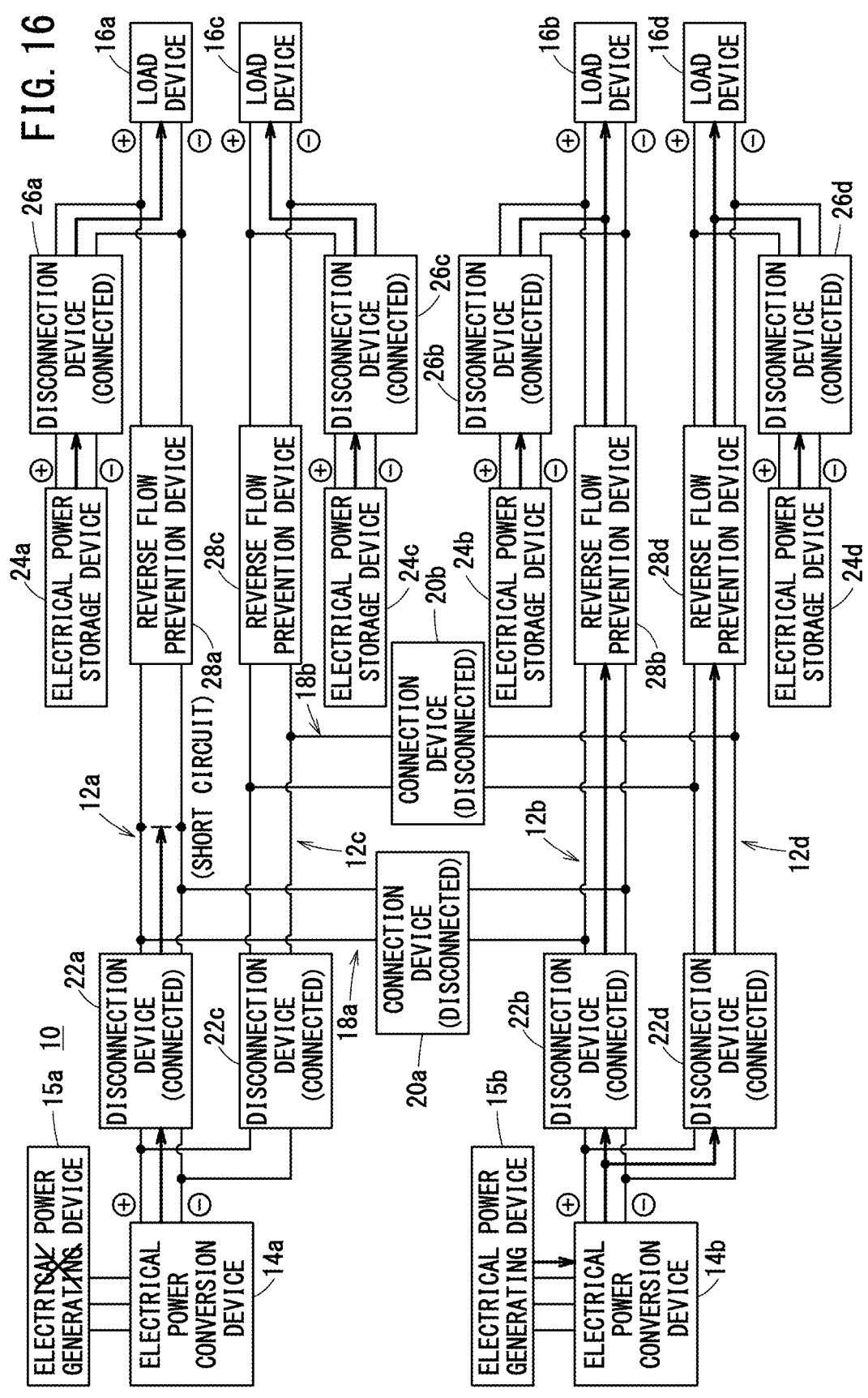
FIG. 16 is a diagram showing operations of the electrical power supply system at a time of an abnormality in the first embodiment.

FIG. 16 is a diagram showing operations of the electrical power supply system 10 at a time of an abnormality in the present embodiment. FIG. 16 shows a state in which a short circuit occurs between the disconnection device 22*a* and the reverse flow prevention device 28*a*.

In this case, a concern arises in that an excessive electrical current may flow between the short circuited location and the first electrical power conversion device 14*a*. However, since the electrical power supply system 10 of the present embodiment is equipped with the reverse flow prevention device 28*a* and the reverse flow prevention device 28*c*, an excessive electrical current does not flow between the short circuited location, and the first load device 16*a*, the first electrical power storage device 24*a*, the third load device 16*c*, and the third electrical power storage device 24*c*. Therefore, the first load device 16*a* and the third load device 16*c* can continue to be driven.

Figure 17:
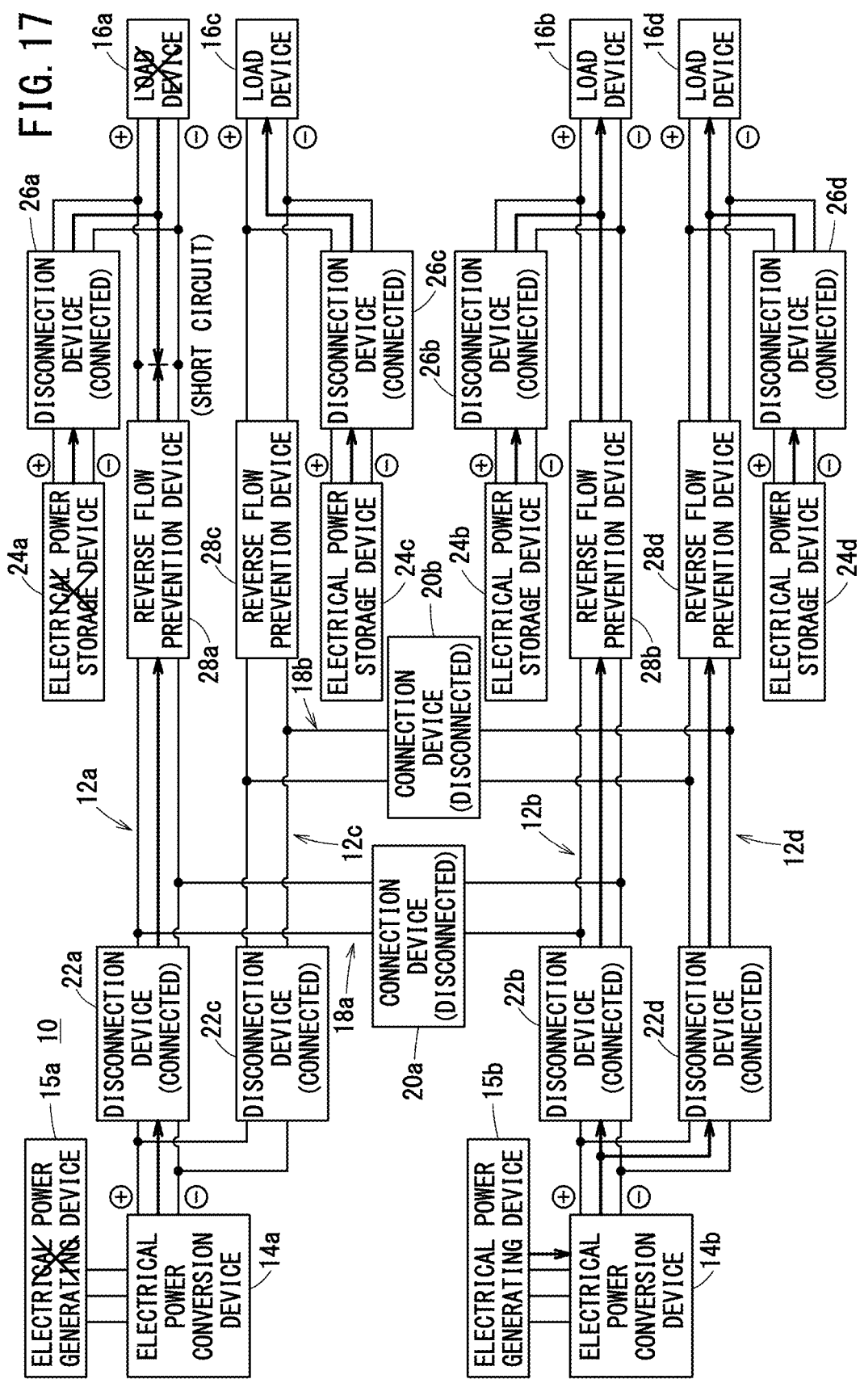
FIG. 17 is a diagram showing operations of the electrical power supply system at a time of an abnormality in the first embodiment.

FIG. 17 is a diagram showing operations of the electrical power supply system 10 at a time of an abnormality in the present embodiment. FIG. 17 shows a state in which a short circuit occurs between the reverse flow prevention device 28*a*, and the first load device 16*a* and the first electrical power storage device 24*a*.

In this case, a concern arises in that an excessive electrical current may flow between the short circuited location, and the first electrical power conversion device 14*a*, the first load device 16*a*, and the first electrical power storage device 24*a*. However, since the electrical power supply system 10 of the present embodiment is equipped with the reverse flow prevention device 28*c*, an excessive electrical current does not flow between the short circuited location, and the third load device 16*c* and the third electrical power storage device 24*c*. Therefore, the third load device 16*c* can continue to be driven.

Comparison Between Electrical Power Supply
System of Present Embodiment and Electrical
Power Supply System of Comparative Example 2

Figure 18:
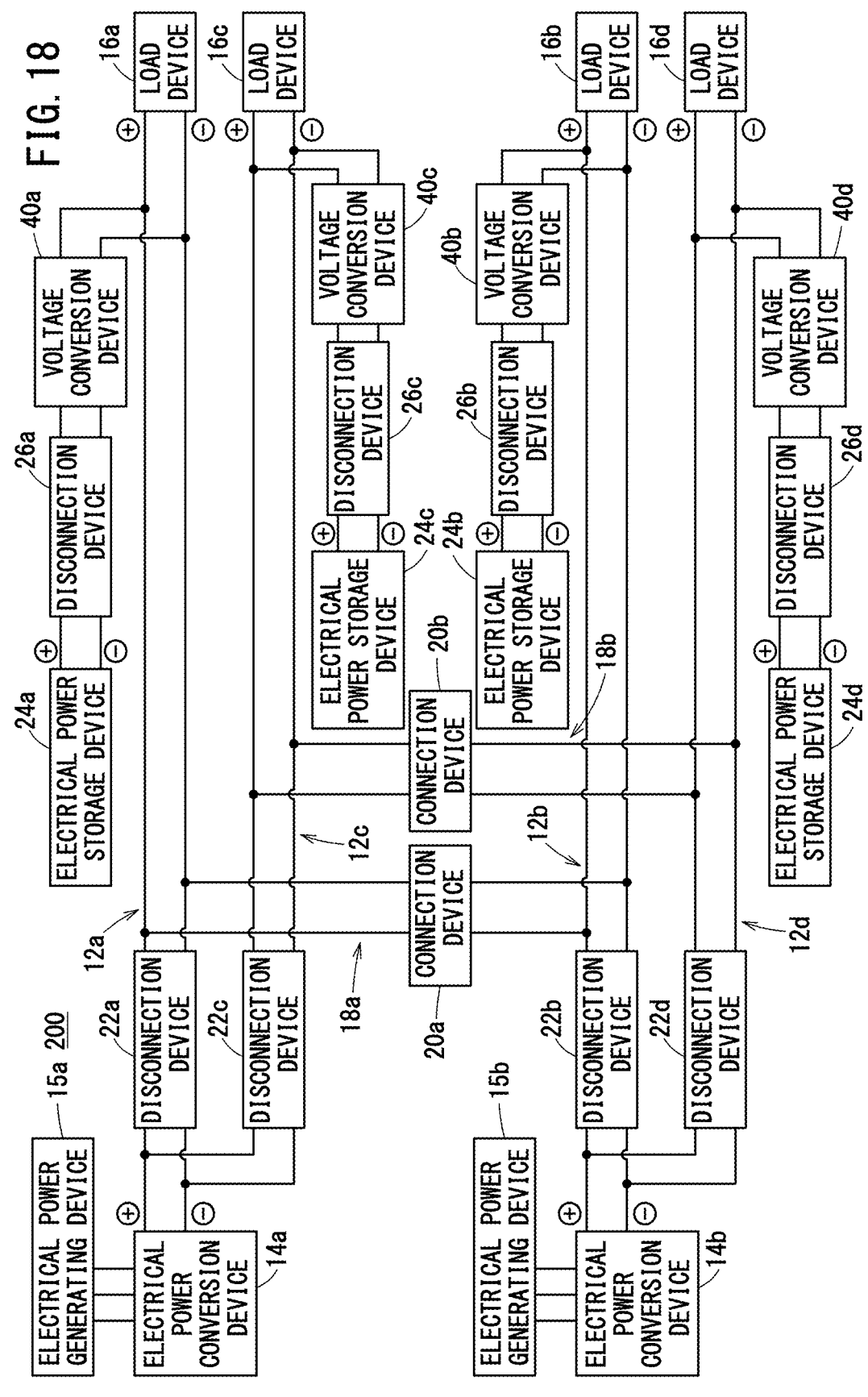
FIG. 18 is a schematic diagram of an electrical power supply system according to Comparative Example 2.

FIG. 18 is a schematic diagram of an electrical power supply system 200 according to Comparative Example 2.

The electrical power supply system 200 of Comparative Example 2 is equipped with voltage conversion devices 40*a* to 40*d*. The voltage conversion devices 40*a* to 40*d* are DC-DC converters.

In the case that the supply of the electrical power from the first electrical power conversion device 14*a* to the first electrical power supply circuit 12*a* and the third electrical power supply circuit 12*c* is cut off, the electrical power supply system 200 makes the output electrical power of the voltage conversion device 40*b* lower than the output voltage of the second electrical power storage device 24*b*. Further, the electrical power supply system 200 makes the output electrical power of the voltage conversion device 40*d* lower than the output voltage of the fourth electrical power storage device 24*d*. Consequently, the output voltage of the second electrical power conversion device 14*b* can be made lower than the output voltage of the second electrical power storage device 24*b* and the output voltage of the fourth electrical power storage device 24*d*.

Therefore, in the case that the first electrical power supply circuit 12*a* and the second electrical power supply circuit 12*b* are connected by the first connection device 20*a*, it is possible to prevent an excessive electrical current from flowing to the first electrical power supply circuit 12*a* and the second electrical power supply circuit 12*b*. Similarly, in the case that the third electrical power supply circuit 12*c* and the fourth electrical power supply circuit 12*d* are connected by the second connection device 20*b*, it is possible to prevent an excessive electrical current from flowing to the third electrical power supply circuit 12*c* and the fourth electrical power supply circuit 12*d*.

However, the voltage conversion devices 40*a* to 40*d* are greater in weight than the reverse flow prevention devices 28*a* to 28*d*. The electrical power supply system 10 of the present embodiment, by being equipped with the reverse flow prevention devices 28*a* to 28*d*, can be made lighter in weight.

Figure 19:
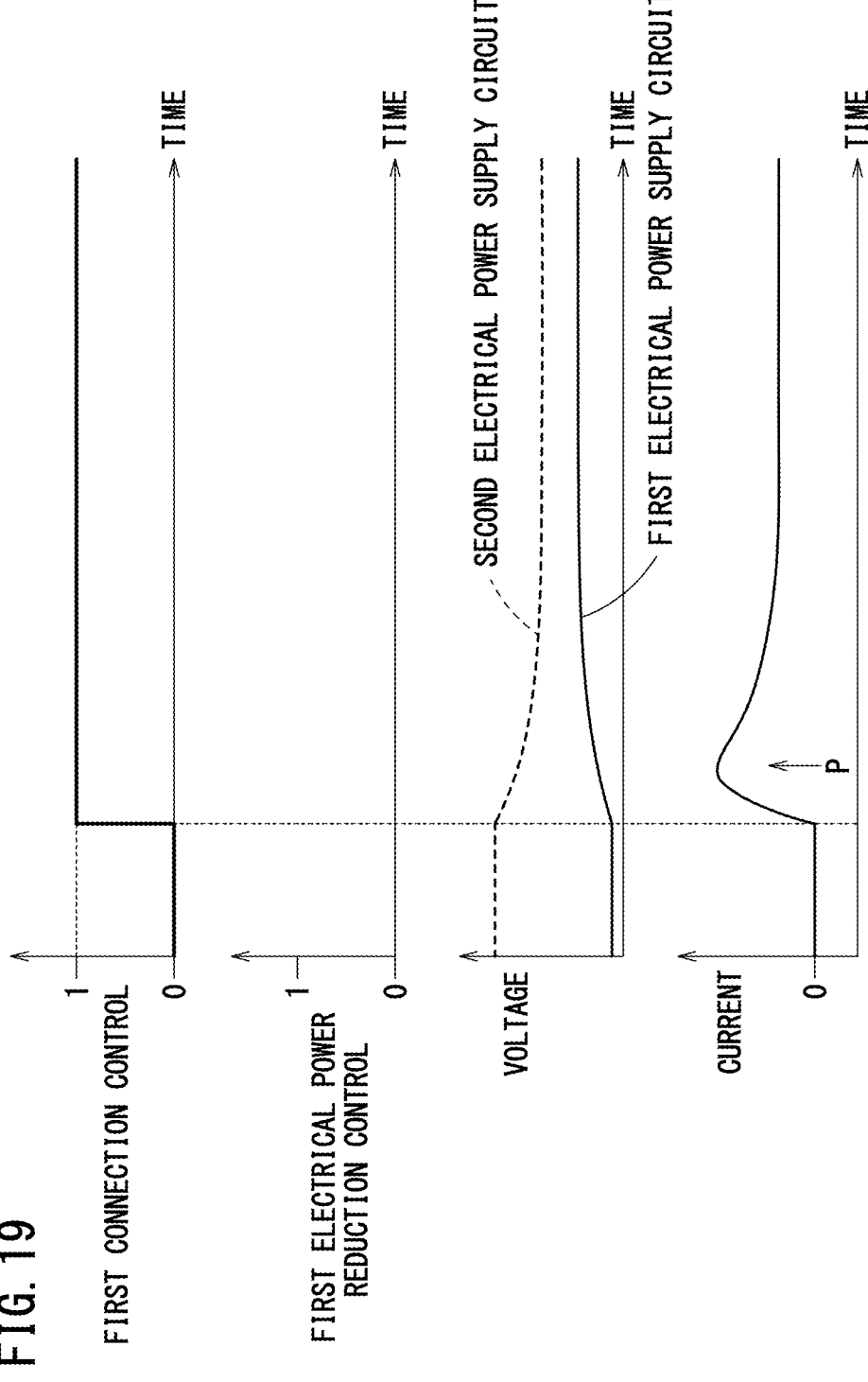
FIG. 19 is a time chart showing a state of the electrical power supply system before and after a first connection control is executed on a first connection device.
Figure 20:
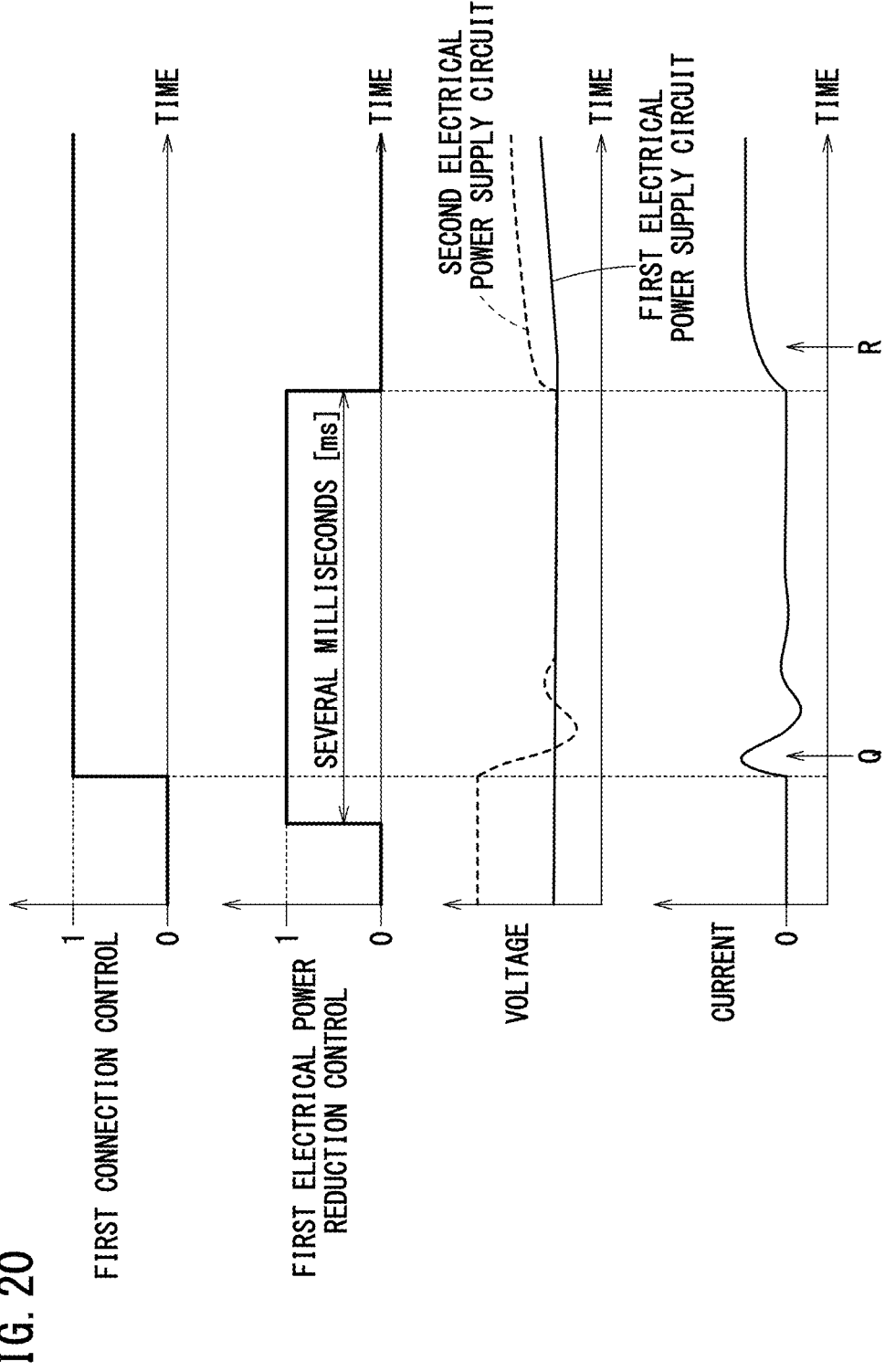
FIG. 20 is a time chart showing a state of the electrical power supply system before and after the first connection control is executed on the first connection device.

Comparison of Whether or Not to Execute First
Electrical Power Reduction Control FIG. 19 and FIG. 20 are time charts showing states of the electrical power supply system 10 before and after the first connection control is executed on the first connection device 20*a*. FIG. 19 is a time chart showing a case in which, prior to the first connection control being executed, the first electrical power reduction control is not executed. FIG. 20 is a time chart showing a case in which, prior to the first connection control being executed, the first electrical power reduction control is executed.

The topmost graphs in FIG. 19 and FIG. 20 are time charts showing an execution state of the first connection control. In the time charts showing the execution state of the first connection control, "1" indicates a state in which the first connection control is being executed, and "0" indicates a state in which the first connection control is not being executed. The second graphs from the top in FIG. 19 and FIG. 20 are time charts showing an execution state of the first electrical power reduction control. In the time charts showing the execution state of the first electrical power reduction control, "1" indicates a state in which the first electrical power reduction control is being executed, and "0" indicates a state in which the first electrical power reduction control is not being executed. The third graphs from the top in FIG. 19 and FIG. 20 show time charts of the voltage of the first electrical power supply circuit 12*a*, and in addition, time charts of the voltage of the second electrical power supply circuit 12*b*. The bottommost graphs in FIG. 19 and FIG. 20 show time charts of an electrical current in the first connection circuit 18*a*.

In the case that the first electrical power reduction control is not executed prior to the first connection control being executed, then when the first connection control is executed, a large electrical current flows to the first connection circuit 18*a* (refer to the arrow "P" in FIG. 19). Even in the case that the first electrical power reduction control is executed prior to the first connection control being executed, when the first connection control is executed, a large electrical current flows to the first connection circuit 18*a* (refer to the arrow "Q" in FIG. 20).

In comparison with the magnitude of the electrical current at the point in time indicated by the arrow "P" in FIG. 19, the magnitude of the electrical current at the point in time indicated by the arrow "Q" in FIG. 20 is smaller. Therefore, it is possible to prevent or suppress damage from occurring to the first load device 16*a* and the first electrical power storage device 24*a*.

Also when the first electrical power reduction control is terminated after the first connection control has been executed, a large electrical current flows to the first connection circuit 18*a* (refer to the arrow "R" in FIG. 20). This is because short circuiting of the second electrical power generating device 15*b* is eliminated by the first electrical power reduction control being terminated. In comparison with the magnitude of the electrical current at the point in time indicated by the arrow "P" in FIG. 19, the magnitude of the electrical current at the point in time indicated by the arrow "R" in FIG. 20 is smaller. Therefore, it is possible to prevent or suppress damage from occurring to the first load device 16*a* and the first electrical power storage device 24*a*. Moreover, the time period during which the first electrical power reduction control is executed is several milliseconds [ms].

Second Embodiment

The configuration of the electrical power supply system 10 according to the present embodiment is the same as the configuration of the electrical power supply system 10 according to the first embodiment. A failsafe control executed by the control device 34 of the present embodiment differs in part from the failsafe control executed by the control device 34 of the first embodiment.

Operations of Electrical Power Supply System at
Time of Abnormality

FIG. 21 to FIG. 24 are diagrams showing operations of the electrical power supply system 10 at a time of an abnormality in the present embodiment. The arrows shown in FIG. 21 to FIG. 24 indicate electrical power supply pathways. FIG. 21 to FIG. 24 show operations of the electrical power supply system 10 in the case that the supply of the electrical power from the first electrical power conversion device 14*a* to the first load device 16*a* is stopped.

A state in which the supply of the electrical power from the first electrical power conversion device 14*a* to the first load device 16*a* is stopped, for example, is a state in which the first load device 16*a* is stopped, and the first load device 16*a* is incapable of being restarted. Further, this is a state in which a short circuit, a wire breakage, or the like has occurred between the disconnection device 22*a* and the first load device 16*a*.

Figure 21:
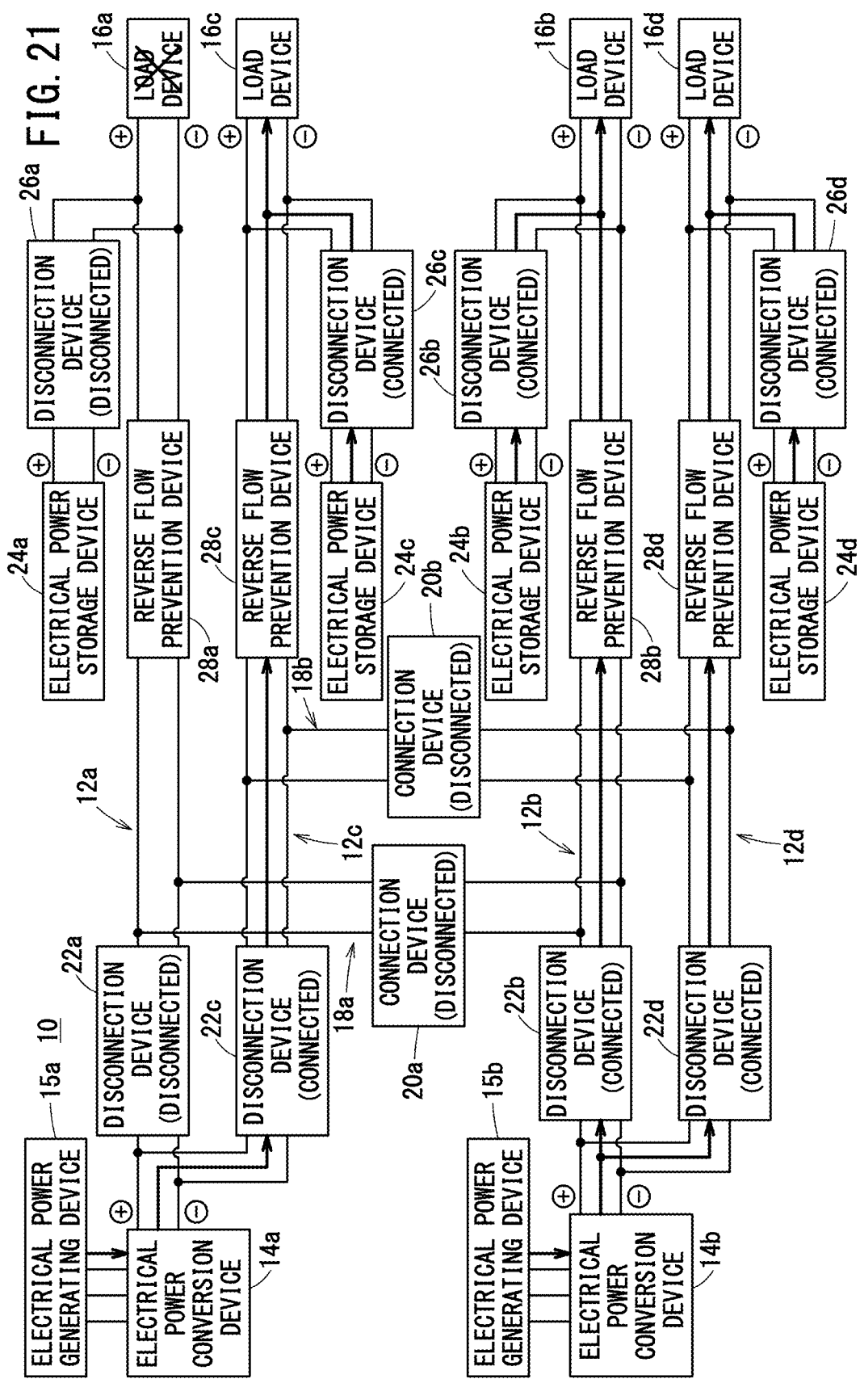
FIG. 21 is a diagram showing operations of the electrical power supply system at a time of an abnormality in a second embodiment.

In the case that the supply of the electrical power from the first electrical power conversion device 14*a* to the first load device 16*a* is stopped, then as shown in FIG. 21, the first electrical power conversion device 14*a* is disconnected by the disconnection device 22*a* from the first electrical power supply circuit 12*a* and the first connection circuit 18*a*.

The first electrical power conversion device 14*a* supplies electrical power only to the third load device 16*c*. In contrast thereto, the second electrical power conversion device 14*b* supplies electrical power to both of the second load device 16*b* and the fourth load device 16*d*. Therefore, the SOC of the second electrical power storage device 24*b* and the SOC of the fourth electrical power storage device 24*d* become lower than the SOC of the third electrical power storage device 24*c*. As a result, the output voltage of the second electrical power storage device 24*b* and the output voltage of the fourth electrical power storage device 24*d* become lower than the output voltage of the third electrical power storage device 24*c*. Therefore, the voltage of the third electrical power supply circuit 12*c* becomes higher than the voltage of the fourth electrical power supply circuit 12*d*.

In this state, in the case that the third electrical power supply circuit 12*c* and the fourth electrical power supply circuit 12*d* are connected, there is a possibility that an excessive electrical current may flow to the second electrical power conversion device 14*b*, the second load device 16*b*, the second electrical power storage device 24*b*, the fourth load device 16*d*, and the fourth electrical power storage device 24*d*. Therefore, a concern arises in that damage may occur to the second electrical power conversion device 14*b*, the second load device 16*b*, the second electrical power storage device 24*b*, the fourth load device 16*d*, and the fourth electrical power storage device 24*d*.

Figure 22:
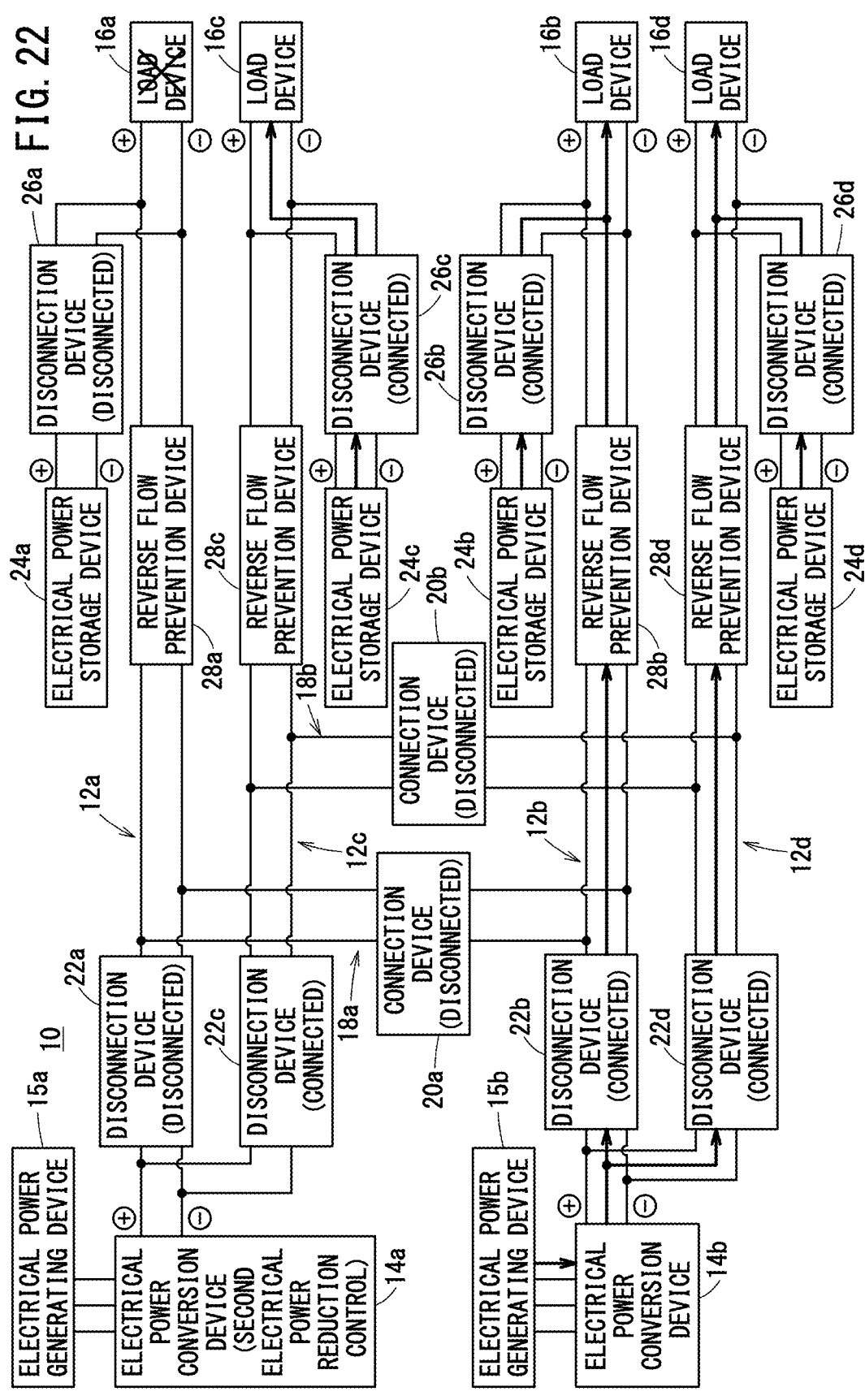
FIG. 22 is a diagram showing operations of the electrical power supply system at a time of an abnormality in the second embodiment.

In the electrical power supply system 10 of the present embodiment, as shown in FIG. 22, the second electrical power reduction control is executed on the first electrical power conversion device 14*a*. The second electrical power reduction control is a control in which the output of the first electrical power generating device 15*a* is short circuited in the first electrical power conversion device 14*a*, and thereby the DC electrical power output from the first electrical power conversion device 14*a* is reduced. Consequently, only the DC electrical power that is stored in the smoothing capacitor 21 is output from the first electrical power conversion device 14*a*.

Figure 23:
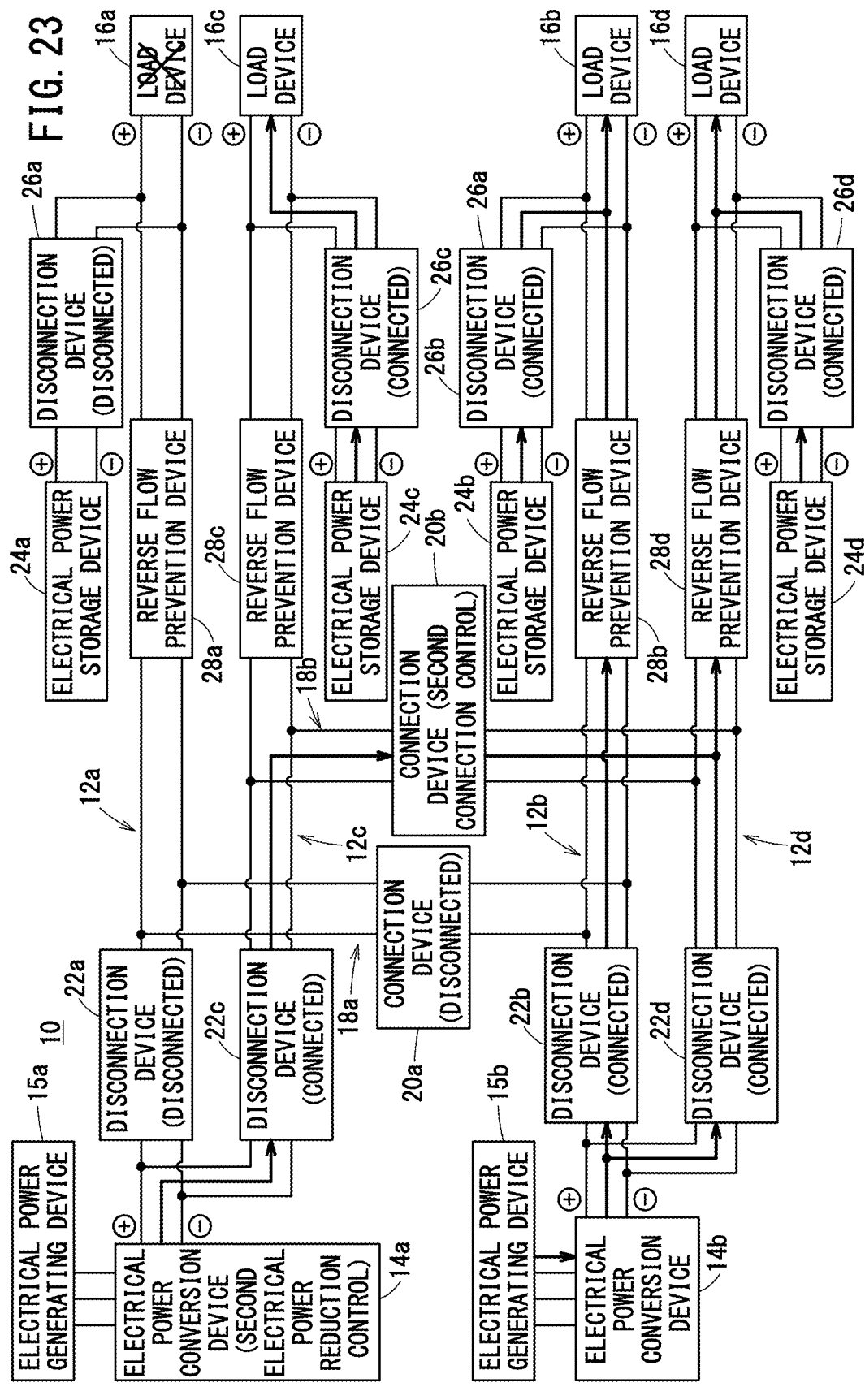
FIG. 23 is a diagram showing operations of the electrical power supply system at a time of an abnormality in the second embodiment.

After the second electrical power reduction control has been executed on the first electrical power conversion device 14*a*, the second connection control that causes the third electrical power supply circuit 12*c* and the fourth electrical power supply circuit 12*d* to be connected is executed on the second connection device 20*b* as shown in FIG. 23 in a state in which the second electrical power reduction control is continued. At this time, since the voltage of the fourth electrical power supply circuit 12*d* is lower than the voltage of the third electrical power supply circuit 12*c*, a comparatively large electrical current flows to the second connection circuit 18*b* and the fourth electrical power supply circuit 12*d*. However, since the second electrical power reduction control is being executed, in comparison to a case in which the second electrical power reduction control is not being executed, the electrical current that flows to the second connection circuit 18*b* and the fourth electrical power supply circuit 12*d* can be made smaller. Therefore, it is possible to prevent or suppress damage from occurring to the fourth load device 16*d* and the fourth electrical power storage device 24*d*.

Figure 24:
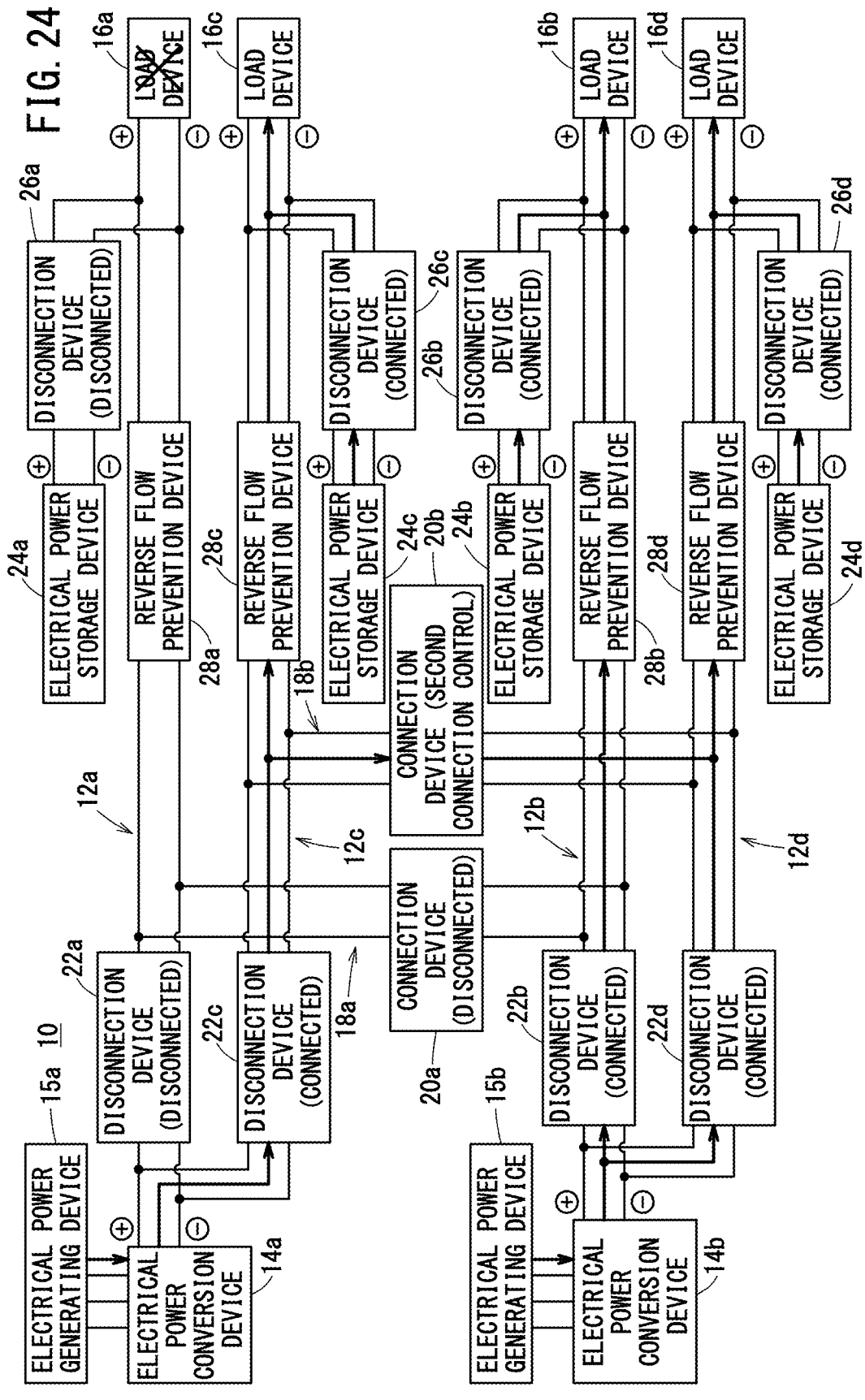
FIG. 24 is a diagram showing operations of the electrical power supply system at a time of an abnormality in the second embodiment.

In the case that the difference between the voltage of the third electrical power supply circuit 12c and the voltage of the fourth electrical power supply circuit 12d has become less than or equal to a predetermined voltage threshold value, then as shown in FIG. 24, the second electrical power reduction control for the first electrical power conversion device 14a is terminated. Consequently, the three-phase AC electrical power of the first electrical power generating device 15a is converted into a DC electrical power in the first electrical power conversion device 14a, and is supplied to the fourth load device 16d.

Failsafe Control

Figure 25:
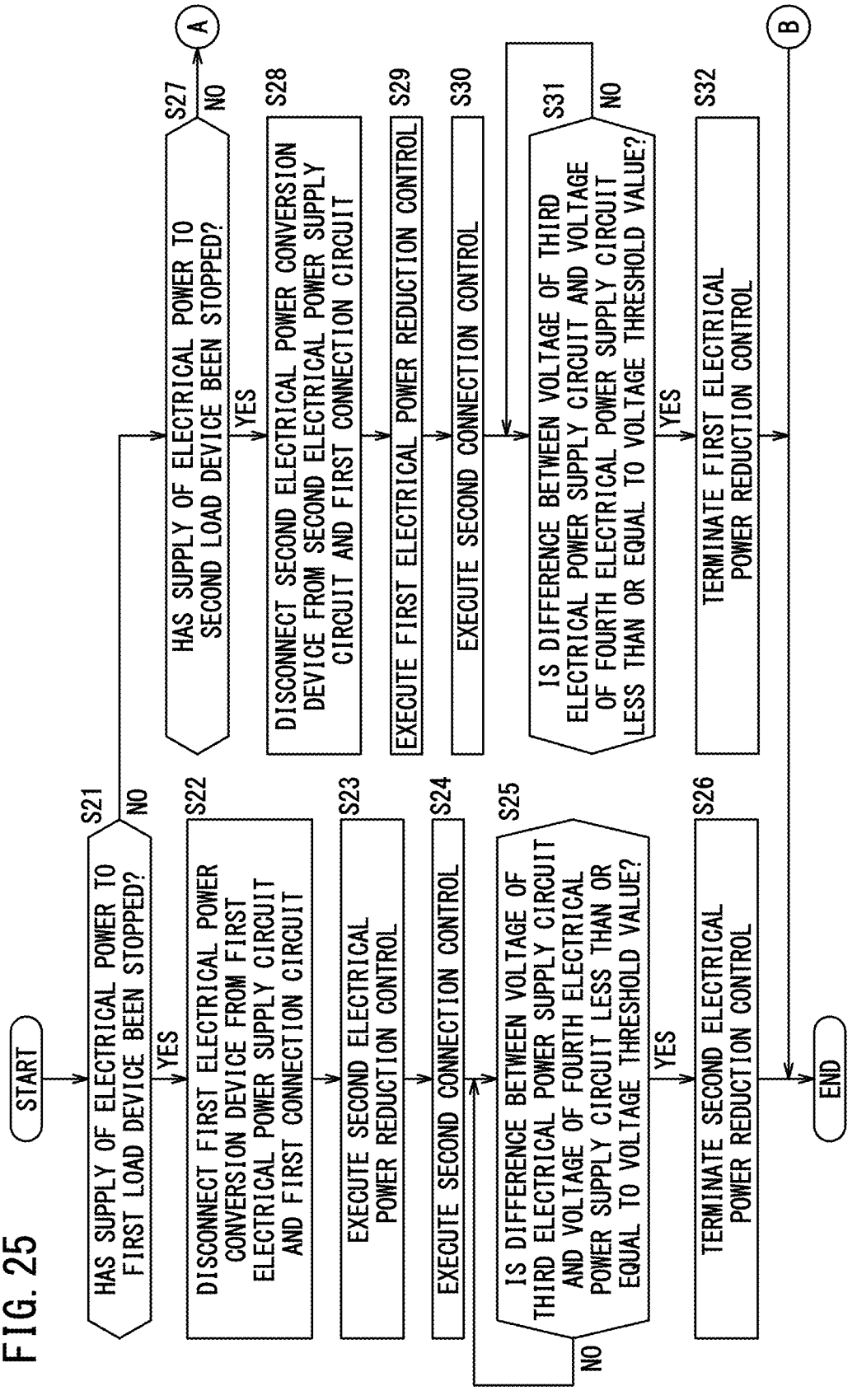
FIG. 25 is a flowchart showing a failsafe control in the second embodiment.
Figure 26:
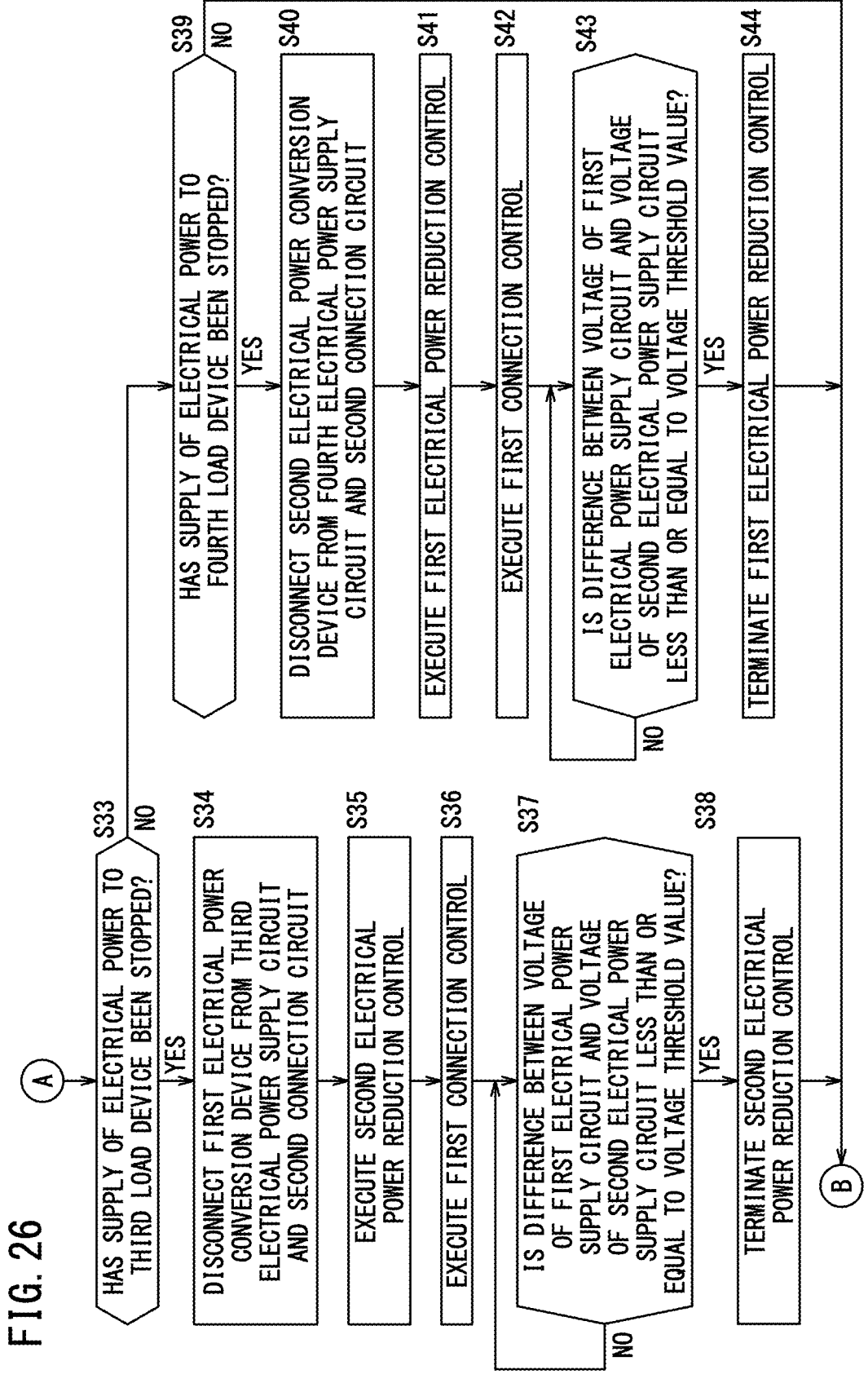
FIG. 26 is a flowchart showing a failsafe control in the second embodiment.

FIG. 25 and FIG. 26 are flowcharts showing a failsafe control in the present embodiment. The failsafe control is repeatedly executed at a predetermined cycle.

In step S21, the control device 34 determines whether or not the supply of the electrical power from the first electrical power conversion device 14a to the first load device 16a has been stopped. In the case it is determined that the supply of the electrical power from the first electrical power conversion device 14a to the first load device 16a has been stopped (step S21: YES), the process transitions to step S22.

In step S22, the control device 34 controls the disconnection device 22a, and thereby disconnects the first electrical power conversion device 14a from the first electrical power supply circuit 12a and the first connection circuit 18a. Thereafter, the process transitions to step S23.

In step S23, the control device 34 executes the second electrical power reduction control on the first electrical power conversion device 14a. Consequently, the electrical power output from the first electrical power conversion device 14a is made small. Thereafter, the process transitions to step S24. In the case that the first electrical power conversion device 14a is controlled by a control device other than the control device 34, the other control device may execute the second electrical power reduction control on the first electrical power conversion device 14a.

In step S24, the control device 34 executes the second connection control on the second connection device 20b. Consequently, via the second connection circuit 18b, the third electrical power supply circuit 12c and the fourth electrical power supply circuit 12d are connected. Thereafter, the process transitions to step S25.

In step S25, the control device 34 determines whether or not the difference between the voltage of the third electrical power supply circuit 12c and the voltage of the fourth electrical power supply circuit 12d is less than or equal to a predetermined voltage threshold value. In the case it is determined that the difference between the voltage of the third electrical power supply circuit 12c and the voltage of the fourth electrical power supply circuit 12d is less than or equal to the predetermined voltage threshold value, the process transitions to step S26. In the case it is determined that the difference between the voltage of the third electrical power supply circuit 12c and the voltage of the fourth electrical power supply circuit 12d is greater than the predetermined voltage threshold value, the process of step S25 is repeated.

In step S26, the control device 34 terminates the second electrical power reduction control for the first electrical power conversion device 14a. Thereafter, the failsafe control is terminated. Moreover, the process of step S25 may be omitted, and the second electrical power reduction control may be terminated after a predetermined time threshold value has elapsed from a point in time at which the second connection control was executed. In the case that the first electrical power conversion device 14a is controlled by a control device other than the control device 34, the other control device may terminate the second electrical power reduction control for the first electrical power conversion device 14a.

In step S21, in the case it is determined that the electrical power is being supplied from the first electrical power conversion device 14a to the first load device 16a (step S21: NO), the process transitions to step S27.

In step S27, the control device 34 determines whether or not the supply of the electrical power from the second electrical power conversion device 14b to the second load device 16b has been stopped. In the case it is determined that the supply of the electrical power from the second electrical power conversion device 14b to the second load device 16b has been stopped (step S27: YES), the process transitions to step S28.

In step S28, the control device 34 controls the disconnection device 22b, and thereby disconnects the second electrical power conversion device 14b from the second electrical power supply circuit 12b and the first connection circuit 18a. Thereafter, the process transitions to step S29.

In step S29, the control device 34 executes the first electrical power reduction control on the second electrical power conversion device 14b. Consequently, the electrical power output from the second electrical power conversion device 14b is made small. Thereafter, the process transitions to step S30. In the case that the second electrical power conversion device 14b is controlled by a control device other than the control device 34, the other control device may execute the first electrical power reduction control on the second electrical power conversion device 14b.

In step S30, the control device 34 executes the second connection control on the second connection device 20b. Consequently, via the second connection circuit 18b, the third electrical power supply circuit 12c and the fourth electrical power supply circuit 12d are connected. Thereafter, the process transitions to step S31.

In step S31, the control device 34 determines whether or not the difference between the voltage of the third electrical power supply circuit 12c and the voltage of the fourth electrical power supply circuit 12d is less than or equal to a predetermined voltage threshold value. In the case it is determined that the difference between the voltage of the third electrical power supply circuit 12c and the voltage of the fourth electrical power supply circuit 12d is less than or equal to the predetermined voltage threshold value, the process transitions to step S32. In the case it is determined that the difference between the voltage of the third electrical power supply circuit 12c and the voltage of the fourth electrical power supply circuit 12d is greater than the predetermined voltage threshold value, the process of step S31 is repeated.

In step S32, the control device 34 terminates the first electrical power reduction control for the second electrical power conversion device 14b. Thereafter, the failsafe control is terminated. Moreover, the process of step S31 may be omitted, and the first electrical power reduction control may be terminated after a predetermined time threshold value has elapsed from a point in time at which the second connection control was executed. In the case that the second electrical power conversion device 14b is controlled by a control device other than the control device 34, the other control device may terminate the first electrical power reduction control for the second electrical power conversion device 14b.

In step S27, in the case it is determined that the electrical power is being supplied from the second electrical power conversion device 14b to the second load device 16b (step S27: NO), the process transitions to step S33.

In step S33, the control device 34 determines whether or not the supply of the electrical power from the first electrical power conversion device 14a to the third load device 16c has been stopped. In the case it is determined that the supply of the electrical power from the first electrical power conversion device 14a to the third load device 16c has been stopped (step S33: YES), the process transitions to step S34.

In step S34, the control device 34 controls the disconnection device 22c, and thereby disconnects the first electrical power conversion device 14a from the third electrical power supply circuit 12c and the second connection circuit 18b. Thereafter, the process transitions to step S35.

In step S35, the control device 34 executes the second electrical power reduction control on the first electrical power conversion device 14a. Consequently, the electrical power output from the first electrical power conversion device 14a is made small. Thereafter, the process transitions to step S36. In the case that the first electrical power conversion device 14a is controlled by a control device other than the control device 34, the other control device may execute the second electrical power reduction control on the first electrical power conversion device 14a.

In step S36, the control device 34 executes the first connection control on the first connection device 20a. Consequently, via the first connection circuit 18a, the first electrical power supply circuit 12a and the second electrical power supply circuit 12b are connected. Thereafter, the process transitions to step S37.

In step S37, the control device 34 determines whether or not the difference between the voltage of the first electrical power supply circuit 12a and the voltage of the second electrical power supply circuit 12b is less than or equal to a predetermined voltage threshold value. In the case it is determined that the difference between the voltage of the first electrical power supply circuit 12a and the voltage of the second electrical power supply circuit 12b is less than or equal to the predetermined voltage threshold value, the process transitions to step S38. In the case it is determined that the difference between the voltage of the first electrical power supply circuit 12a and the voltage of the second electrical power supply circuit 12b is greater than the predetermined voltage threshold value, the process of step S37 is repeated.

In step S38, the control device 34 terminates the second electrical power reduction control for the first electrical power conversion device 14a. Thereafter, the failsafe control is terminated. Moreover, the process of step S37 may be omitted, and the second electrical power reduction control may be terminated after a predetermined time threshold value has elapsed from a point in time at which the first connection control was executed. In the case that the first electrical power conversion device 14a is controlled by a control device other than the control device 34, the other control device may terminate the second electrical power reduction control for the first electrical power conversion device 14a.

In step S33, in the case it is determined that the electrical power is being supplied from the first electrical power conversion device 14a to the third load device 16c (step S33: NO), the process transitions to step S39.

In step S39, the control device 34 determines whether or not the supply of the electrical power from the second electrical power conversion device 14b to the fourth load device 16d has been stopped. In the case it is determined that the supply of the electrical power from the second electrical power conversion device 14b to the fourth load device 16d has been stopped (step S39: YES), the process transitions to step S40. In the case it is determined that the electrical power is being supplied from the second electrical power conversion device 14b to the fourth load device 16d (step S39: NO), the failsafe control is terminated.

In step S40, the control device 34 controls the disconnection device 22d, and thereby disconnects the second electrical power conversion device 14b from the fourth electrical power supply circuit 12d and the second connection circuit 18b. Thereafter, the process transitions to step S41.

In step S41, the control device 34 executes the first electrical power reduction control on the second electrical power conversion device 14b. Consequently, the electrical power output from the second electrical power conversion device 14b is made small. Thereafter, the process transitions to step S42. In the case that the second electrical power conversion device 14b is controlled by a control device other than the control device 34, the other control device may execute the first electrical power reduction control on the second electrical power conversion device 14b.

In step S42, the control device 34 executes the first connection control on the first connection device 20a. Consequently, via the first connection circuit 18a, the first electrical power supply circuit 12a and the second electrical power supply circuit 12b are connected. Thereafter, the process transitions to step S43.

In step S43, the control device 34 determines whether or not the difference between the voltage of the first electrical power supply circuit 12a and the voltage of the second electrical power supply circuit 12b is less than or equal to a predetermined voltage threshold value. In the case it is determined that the difference between the voltage of the first electrical power supply circuit 12a and the voltage of the second electrical power supply circuit 12b is less than or equal to the predetermined voltage threshold value, the process transitions to step S44. In the case it is determined that the difference between the voltage of the first electrical power supply circuit 12a and the voltage of the second electrical power supply circuit 12b is greater than the predetermined voltage threshold value, the process of step S43 is repeated.

In step S44, the control device 34 terminates the first electrical power reduction control for the second electrical power conversion device 14b. Thereafter, the failsafe control is terminated. Moreover, the process of step S43 may be omitted, and the first electrical power reduction control may be terminated after a predetermined time threshold value has elapsed from a point in time at which the first connection control was executed. In the case that the second electrical power conversion device 14b is controlled by a control device other than the control device 34, the other control device may terminate the first electrical power reduction control for the second electrical power conversion device 14b.

Moreover, it should be noted that both of the failsafe control according to the present embodiment and the failsafe control according to the first embodiment may be carried out.

Third Embodiment

Figure 27:
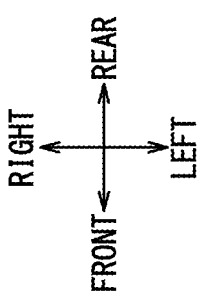
FIG. 27 is a schematic diagram of a moving object according to a third embodiment.
Figure 27:
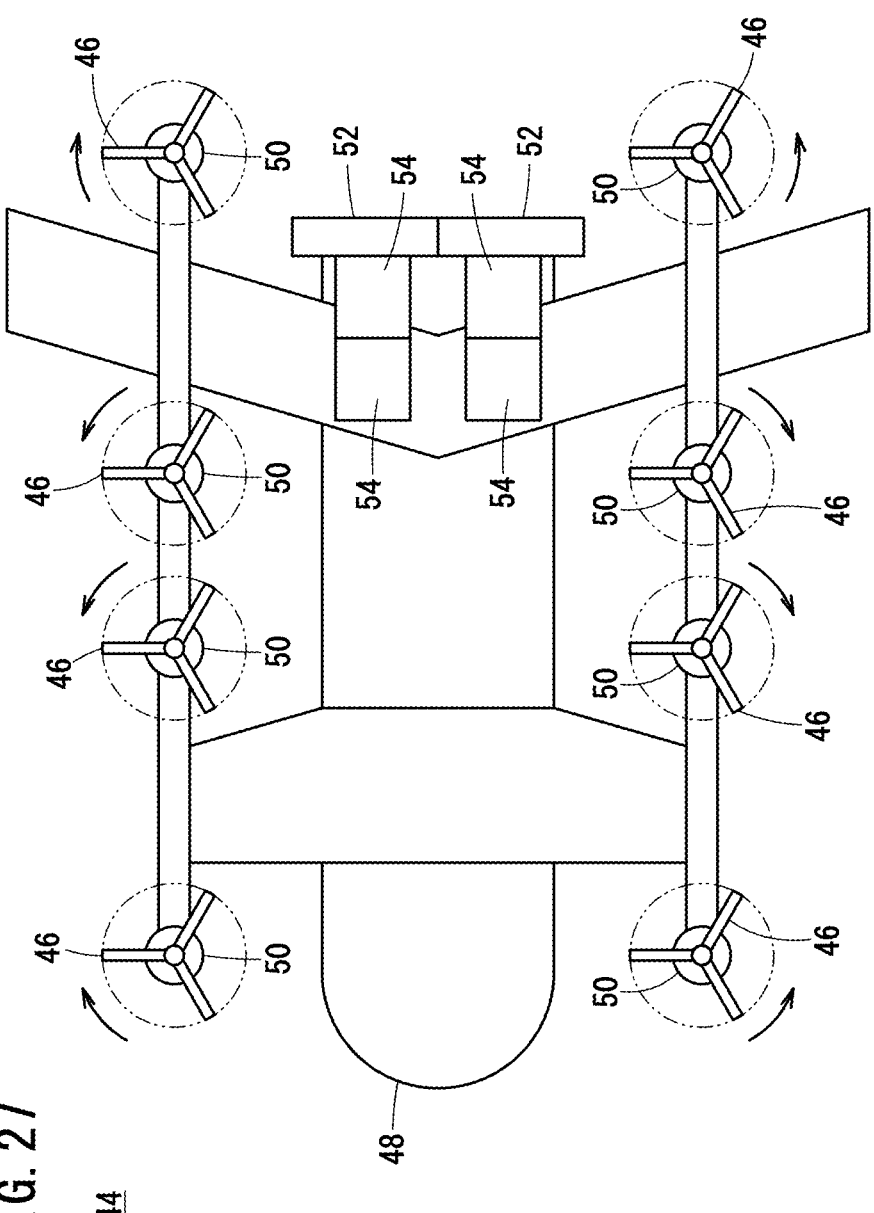

FIG. 27 is a schematic diagram of a moving object 44 according to a third embodiment. The electrical power supply system 10 is mounted in the moving object 44.

The moving object 44 of the present embodiment, for example, is an electric vertical take-off and landing aircraft (eVTOL aircraft). The moving object 44 is equipped with eight VTOL rotors 46. The VTOL rotors 46 generate an upwardly directed thrust with respect to a fuselage 48. The moving object 44 is equipped with eight electric motors 50. One of the electric motors 50 drives one of the VTOL rotors 46. The moving object 44 includes two cruise rotors 52. The cruise rotors 52 generate a forwardly directed thrust with respect to the fuselage 48. The moving object 44 is equipped with four electric motors 54. Two of the electric motors 54 drive one of the cruise rotors 52.

Each of the first load device 16*a*, the second load device 16*b*, the third load device 16*c*, and the fourth load device 16*d* may be equipped with two of the electric motors 50 and one of the electric motors 54, respectively. Each of the first load device 16*a*, the second load device 16*b*, the third load device 16*c*, and the fourth load device 16*d*, apart from the electric motors 50 and the electric motors 54, may be equipped with a low voltage drive device.

The moving object 44 is not limited to being an aircraft, but may be a ship, an automobile, a train, or the like.

In relation to the above-described disclosure, the following supplementary notes are further disclosed.

Supplementary Note 1

The electrical power supply system (10) according to the present disclosure comprises the first electrical power generating device (15*a*) that outputs the three-phase AC electrical power, the second electrical power generating device (15*b*) that outputs the three-phase AC electrical power, the first electrical power conversion device (14*a*) which includes the smoothing capacitor (21), and converts the three-phase AC electrical power output from the first electrical power generating device into the DC electrical power, the second electrical power conversion device (14*b*) which includes the smoothing capacitor, and converts the three-phase AC electrical power output from the second electrical power generating device into the DC electrical power, the first electrical power supply circuit (12*a*) that supplies the DC electrical power output from the first electrical power conversion device to the first load device (16*a*), the second electrical power supply circuit (12*b*) that supplies the DC electrical power output from the second electrical power conversion device to the second load device (16*b*), the first electrical power storage device (24*a*) that is connected to the first electrical power supply circuit in parallel with the first electrical power generating device, the second electrical power storage device (24*b*) that is connected to the second electrical power supply circuit in parallel with the second electrical power generating device, the first connection circuit (18*a*) equipped with the first connection device (20*a*) capable of connecting the first electrical power supply circuit and the second electrical power supply circuit, and the control device (34) which is capable of executing, on the first connection device, the first connection control that causes the first electrical power supply circuit and the second electrical power supply circuit to be connected, wherein, in the case of supplying the DC electrical power output from the second electrical power conversion device to the first load device, the first electrical power reduction control that causes the DC electrical power output from the second electrical power conversion device to be reduced is executed on the second electrical power conversion device, and thereafter, the control device executes the first connection control on the first connection device. In accordance with such a configuration, in the case that the control device executes the first connection control on the first connection device, it is possible to prevent or suppress an excessive electrical current from flowing to the first load device and the first electrical power storage device. Therefore, it is possible to prevent or suppress damage from occurring to the first load device and the first electrical power storage device. In addition, this in turn also contributes to energy efficiency.

Supplementary Note 2

In the electrical power supply system according to Supplementary Note 1, by the first electrical power reduction control being executed on the second electrical power conversion device, the control device may cause the output of the second electrical power generating device to be short circuited in the second electrical power conversion device. In accordance with such a configuration, it is possible to cause the DC electrical power that is output from the second electrical power conversion device to be reduced.

Supplementary Note 3

The electrical power supply system according to Supplementary Note 1 may further comprise the reverse flow prevention device (28*b*) that limits the supply of the DC electrical power from the second electrical power storage device to the second electrical power supply circuit. In accordance with such a configuration, it is possible to suppress damage from occurring to the second electrical power storage device.

Supplementary Note 4

In the electrical power supply system according to Supplementary Note 1, after the first connection control has been executed on the first connection device, the first electrical power reduction control for the second electrical power conversion device may be terminated. In accordance with such a configuration, the three-phase AC electrical power of the second electrical power generating device can be converted into a DC electrical power in the second electrical power conversion device, and can be supplied to the first load device.

Supplementary Note 5

In the electrical power supply system according to Supplementary Note 4, in the case that the difference between the voltage of the first electrical power supply circuit and the voltage of the second electrical power supply circuit has become less than or equal to the predetermined voltage threshold value after the first connection control has been executed on the first connection device, the first electrical power reduction control for the second electrical power conversion device may be terminated. In accordance with such a configuration, the three-phase AC electrical power of the second electrical power generating device can be converted into a DC electrical power in the second electrical power conversion device, and can be supplied to the first load device.

Supplementary Note 6

In the electrical power supply system according to Supplementary Note 4, in the case that an elapsed time period from the point in time when the first connection control was executed on the first connection device has become greater than or equal to the predetermined time threshold value, the first electrical power reduction control for the second electrical power conversion device may be terminated. In accordance with such a configuration, the three-phase AC electrical power of the second electrical power generating device can be converted into a DC electrical power in the second electrical power conversion device, and can be supplied to the first load device.

Supplementary Note 7

The electrical power supply system according to Supplementary Note 1 may further comprise the third electrical power supply circuit (12c) that supplies the DC electrical power output from the first electrical power conversion device to the third load device (16c), the fourth electrical power supply circuit (12d) that supplies the DC electrical power output from the second electrical power conversion device to the fourth load device (16d), the third electrical power storage device (24c) that is connected to the third electrical power supply circuit in parallel with the first electrical power generating device, the fourth electrical power storage device (24d) that is connected to the fourth electrical power supply circuit in parallel with the second electrical power generating device, the second connection circuit (18b) equipped with the second connection device (20b) capable of connecting the third electrical power supply circuit and the fourth electrical power supply circuit, and the disconnection device (22a) which is capable of disconnecting the first electrical power generating device from the first electrical power supply circuit and the first connection circuit, wherein the control device is capable of executing, on the second connection device, the second connection control that causes the third electrical power supply circuit and the fourth electrical power supply circuit to be connected, and wherein, in the case that the supply of the DC electrical power from the first electrical power conversion device to the first load device is stopped, the disconnection control that causes the first electrical power conversion device to be disconnected from the first electrical power supply circuit and the first connection circuit may be executed on the disconnection device, and the second electrical power reduction control that causes the DC electrical power output from the first electrical power conversion device to be reduced may be executed on the first electrical power conversion device, and thereafter, the control device may execute the second connection control on the second connection device. In accordance with such a configuration, in the case that the control device executes the second connection control on the second connection device, it is possible to prevent or suppress an excessive electrical current from flowing to the second electrical power generating device, the second load device, the second electrical power storage device, the fourth load device, and the fourth electrical power storage device. Therefore, it is possible to prevent or suppress damage from occurring to the second electrical power generating device, the second load device, the second electrical power storage device, the fourth load device, and the fourth electrical power storage device.

Supplementary Note 8

The moving object (44) according to the present disclosure comprises the electrical power supply system according to any one of supplementary notes 1 to 7. In accordance with such a configuration, in the case that the control device executes the first connection control on the first connection device, it is possible to prevent or suppress an excessive electrical current from flowing to the first load device and the first electrical power storage device. Therefore, it is possible to prevent or suppress damage from occurring to the first load device and the first electrical power storage device. In addition, this in turn also contributes to energy efficiency.

Supplementary Note 9

The method of controlling the electrical power supply system according to the present disclosure is a method of controlling the electrical power supply system including the first electrical power generating device that outputs the three-phase AC electrical power, the second electrical power generating device that outputs the three-phase AC electrical power, the first electrical power conversion device which includes the smoothing capacitor, and converts the three-phase AC electrical power output from the first electrical power generating device into the DC electrical power, the second electrical power conversion device which includes the smoothing capacitor, and converts the three-phase AC electrical power output from the second electrical power generating device into the DC electrical power, the first electrical power supply circuit that supplies the DC electrical power output from the first electrical power conversion device to the first load device, the second electrical power supply circuit that supplies the DC electrical power output from the second electrical power conversion device to the second load device, the first electrical power storage device that is connected to the first electrical power supply circuit in parallel with the first electrical power generating device, the second electrical power storage device that is connected to the second electrical power supply circuit in parallel with the second electrical power generating device, and the first connection circuit equipped with the first connection device capable of connecting the first electrical power supply circuit and the second electrical power supply circuit, the method comprising, in the case of supplying the DC electrical power output from the second electrical power conversion device to the first load device, executing, on the second electrical power conversion device, the first electrical power reduction control that causes the DC electrical power output from the second electrical power conversion device to be reduced, and thereafter executing, on the first connection device, the first connection control that causes the first electrical power supply circuit and the second electrical power supply circuit to be connected. In accordance with such features, it is possible to prevent or suppress an excessive electrical current from being generated in the electrical power supply system. In accordance with such a configuration, in the case that the control device executes the first connection control on the first connection device, it is possible to prevent or suppress an excessive electrical current from flowing to the first load device and the first electrical power storage device. Therefore, it is possible to prevent or suppress damage from occurring to the first load device and the first electrical power storage device. In addition, this in turn also contributes to energy efficiency.

Although concerning the present disclosure, a detailed description thereof has been presented above, the present disclosure is not necessarily limited to the individual embodiments described above. These embodiments may be subjected to various additions, substitutions, modifications, partial deletions and the like, within a range that does not deviate from the essence and gist of the present disclosure, or the gist of the present disclosure as derived from the content described in the claims and equivalents thereof. Further, the embodiments can also be implemented together in combination. For example, in the above-described embodiments, the order of the operations and the order of the processes are illustrated as examples, and the present disclosure is not necessarily limited to these features. The same also applies to cases in which numerical values or mathematical expressions are used in the description of the aforementioned embodiments.

The invention claimed is:

1. An electrical power supply system, comprising:
a first electrical power generating device configured to output a three-phase alternating current electrical power;
a second electrical power generating device configured to output a three-phase alternating current electrical power;
a first electrical power conversion device including a smoothing capacitor, and configured to convert the three-phase alternating current electrical power output from the first electrical power generating device into a direct current electrical power;
a second electrical power conversion device including a smoothing capacitor, and configured to convert the three-phase alternating current electrical power output from the second electrical power generating device into a direct current electrical power;
a first electrical power supply circuit configured to supply the direct current electrical power output from the first electrical power conversion device to a first load device;
a second electrical power supply circuit configured to supply the direct current electrical power output from the second electrical power conversion device to a second load device;
a first electrical power storage device configured to be connected to the first electrical power supply circuit in parallel with the first electrical power generating device;
a second electrical power storage device configured to be connected to the second electrical power supply circuit in parallel with the second electrical power generating device;
a first connection circuit equipped with a first connection device configured to connect the first electrical power supply circuit and the second electrical power supply circuit; and
a control device configured to execute, on the first connection device, a first connection control that causes the first electrical power supply circuit and the second electrical power supply circuit to be connected,
wherein the control device comprises one or more processors that execute computer-executable instructions stored in a memory, and
wherein, in a case of supplying the direct current electrical power output from the second electrical power conversion device to the first load device, a first electrical power reduction control that causes the direct current electrical power output from the second electrical power conversion device to be reduced is executed on the second electrical power conversion device, and thereafter, the one or more processors execute the computer-executable instructions to cause the control device to execute the first connection control on the first connection device.

2. The electrical power supply system according to claim 1, wherein by the first electrical power reduction control being executed on the second electrical power conversion device, an output of the second electrical power generating device is short circuited in the second electrical power conversion device.

3. The electrical power supply system according to claim 1, further comprising a reverse flow prevention device configured to limit supply of the direct current electrical power from the second electrical power storage device to the second electrical power supply circuit.

4. The electrical power supply system according to claim 1, wherein after the first connection control has been executed on the first connection device, the first electrical power reduction control for the second electrical power conversion device is terminated.

5. The electrical power supply system according to claim 4, wherein, in a case that a difference between a voltage of the first electrical power supply circuit and a voltage of the second electrical power supply circuit has become less than or equal to a predetermined voltage threshold value after the first connection control has been executed on the first connection device, the first electrical power reduction control for the second electrical power conversion device is terminated.

6. The electrical power supply system according to claim 4, wherein, in a case that an elapsed time period from a point in time when the first connection control was executed on the first connection device has become greater than or equal to a predetermined time threshold value, the first electrical power reduction control for the second electrical power conversion device is terminated.

7. The electrical power supply system according to claim 1, further comprising:
a third electrical power supply circuit configured to supply the direct current electrical power output from the first electrical power conversion device to a third load device;
a fourth electrical power supply circuit configured to supply the direct current electrical power output from the second electrical power conversion device to a fourth load device;
a third electrical power storage device configured to be connected to the third electrical power supply circuit in parallel with the first electrical power generating device;
a fourth electrical power storage device configured to be connected to the fourth electrical power supply circuit in parallel with the second electrical power generating device;
a second connection circuit equipped with a second connection device configured to connect the third electrical power supply circuit and the fourth electrical power supply circuit; and
a disconnection device configured to disconnect the first electrical power generating device from the first electrical power supply circuit and the first connection circuit,
wherein the control device is configured to execute, on the second connection device, a second connection control that causes the third electrical power supply circuit and the fourth electrical power supply circuit to be connected, and
wherein, in a case that supply of the direct current electrical power from the first electrical power conversion device to the first load device is stopped, a disconnection control that causes the first electrical power conversion device to be disconnected from the first electrical power supply circuit and the first connection circuit is executed on the disconnection device, and a second electrical power reduction control that causes the direct current electrical power output from the first electrical power conversion device to be reduced is executed on the first electrical power conversion device, and thereafter, the one or more processors cause the control device to execute the second connection control on the second connection device.

8. A moving object comprising the electrical power supply system according to claim 1.

9. A method of controlling an electrical power supply system, the electrical power supply system including:

a first electrical power generating device configured to output a three-phase alternating current electrical power;

a second electrical power generating device configured to output a three-phase alternating current electrical power;

a first electrical power conversion device including a smoothing capacitor, and configured to convert the three-phase alternating current electrical power output from the first electrical power generating device into a direct current electrical power;

a second electrical power conversion device including a smoothing capacitor, and configured to convert the three-phase alternating current electrical power output from the second electrical power generating device into a direct current electrical power;

a first electrical power supply circuit configured to supply the direct current electrical power output from the first electrical power conversion device to a first load device;

a second electrical power supply circuit configured to supply the direct current electrical power output from the second electrical power conversion device to a second load device;

a first electrical power storage device configured to be connected to the first electrical power supply circuit in parallel with the first electrical power generating device;

a second electrical power storage device configured to be connected to the second electrical power supply circuit in parallel with the second electrical power generating device; and a first connection circuit equipped with a first connection device configured to connect the first electrical power supply circuit and the second electrical power supply circuit, the method comprising, in a case of supplying the direct current electrical power output from the second electrical power conversion device to the first load device, executing, on the second electrical power conversion device, a first electrical power reduction control that causes the direct current electrical power output from the second electrical power conversion device to be reduced, and thereafter executing, on the first connection device, a first connection control that causes the first electrical power supply circuit and the second electrical power supply circuit to be connected.

* * * * *